(12) United States Patent
Kitahara et al.

(10) Patent No.: US 10,487,188 B2
(45) Date of Patent: Nov. 26, 2019

(54) PROPYLENE RESIN FOAMED PARTICLE AND FOAMED PARTICLE MOLDED BODY

(71) Applicant: JSP Corporation, Chiyoda-ku, Tokyo (JP)

(72) Inventors: Taizo Kitahara, Yokkaichi (JP); Michitoshi Ono, Chiyoda-ku (JP); Kazuo Tsurugai, Utsunomiya (JP)

(73) Assignee: JSP Corporation, Tokyo (JP)

( * ) Notice: Subject to any disclaimer, the term of this patent is extended or adjusted under 35 U.S.C. 154(b) by 0 days.

(21) Appl. No.: 15/744,219

(22) PCT Filed: Jul. 13, 2016

(86) PCT No.: PCT/JP2016/070624
§ 371 (c)(1),
(2) Date: Jan. 12, 2018

(87) PCT Pub. No.: WO2017/010494
PCT Pub. Date: Jan. 19, 2017

(65) Prior Publication Data
US 2018/0215891 A1    Aug. 2, 2018

(30) Foreign Application Priority Data

Jul. 15, 2015  (JP) ................. 2015-141333

(51) Int. Cl.
*C08J 9/18* (2006.01)
*C08J 9/232* (2006.01)
(Continued)

(52) U.S. Cl.
CPC ............. *C08J 9/232* (2013.01); *C08J 9/18* (2013.01); *C08K 5/0066* (2013.01); *C08K 5/136* (2013.01);
(Continued)

(58) Field of Classification Search
CPC ................ C08J 2323/12; C08J 9/16–20
See application file for complete search history.

(56) References Cited

U.S. PATENT DOCUMENTS 9,230,710 B2    1/2016  Chiba et al.
2005/0113473 A1   5/2005  Wada
(Continued)

FOREIGN PATENT DOCUMENTS

JP      10-77359 A      3/1998
JP   2001-162640 A      6/2001
(Continued)

OTHER PUBLICATIONS

Lieberman, R. and Stewart, C. (2004). Propylene Polymers. In Encyclopedia of Polymer Science and Technology, (Ed.). doi: 10.1002/0471440264.pst301 pp. 328-335. (Year: 2004).*
(Continued)

*Primary Examiner* — Michael M Dollinger
*Assistant Examiner* — Christina H. W. Rosebach
(74) *Attorney, Agent, or Firm* — Fitch, Even, Tabin & Flannery LLP

(57) ABSTRACT

The present invention is concerned with expanded propylene resin beads including a core layer being in a foamed state, having a tubular shape, and being constituted of a propylene-based resin composition (a) satisfying the following (i) and (ii) and a cover layer being constituted of an olefin-based resin (b) satisfying the following (iii) or (iv).
  (i) A mixture of 75% by weight to 98% by weight of a propylene-based resin (a1) having a melting point of 100° C. to 140° C. and 25% by weight to 2% by weight of a propylene-based resin (a2) having a melting point of 140° C. to 165° C.
  (ii) A difference between the melting point of the resin (a2) and the melting point of the resin (a1) is 15° C. or more.

(Continued)

(iii) A crystalline olefin-based resin having a melting point TmB that is lower than a melting point TmA of the composition (a) and having a relation of $0°C.<[TmA-TmB]\leq 80°C$.

(iv) A non-crystalline olefin-based resin having a softening point TsB that is lower than TmA and having a relation of $0°C.<[TmA-TsB]\leq 100°C$.

20 Claims, 7 Drawing Sheets

(51) Int. Cl.
  *C08K 5/00* (2006.01)
  *C08K 5/136* (2006.01)
  *C08K 5/01* (2006.01)
  *C08K 5/02* (2006.01)

(52) U.S. Cl.
  CPC ............. *C08J 2323/10* (2013.01); *C08K 5/01* (2013.01); *C08K 5/02* (2013.01); *C08L 2205/025* (2013.01)

(56) References Cited

U.S. PATENT DOCUMENTS

| | | | |
|---|---|---|---|
| 2005/0164000 A1* | 7/2005 | Okuyama | B29C 44/445 428/403 |
| 2006/0223897 A1* | 10/2006 | Sasaki | C08J 9/18 521/60 |
| 2007/0208140 A1 | 9/2007 | Wada | |
| 2008/0039588 A1* | 2/2008 | Shibata | C08J 9/0061 525/240 |
| 2009/0169895 A1 | 7/2009 | Nohara et al. | |
| 2010/0105787 A1 | 4/2010 | Sasaki et al. | |
| 2011/0152412 A1* | 6/2011 | Hogt | C08K 5/01 524/101 |
| 2013/0266792 A1* | 10/2013 | Nohara | B29C 44/04 428/221 |
| 2015/0025162 A1* | 1/2015 | Sato | C08J 9/18 521/94 |
| 2015/0158990 A1 | 6/2015 | Takagi et al. | |

FOREIGN PATENT DOCUMENTS

| | | |
|---|---|---|
| JP | 2004-68016 A | 3/2004 |
| JP | 2004-176047 A | 6/2004 |
| JP | 2005-139350 A | 6/2005 |
| JP | 2009-221258 A | 10/2009 |
| JP | 2011-16914 | 1/2011 |
| JP | 2012-126816 A | 7/2012 |
| WO | 2006/054727 A1 | 5/2006 |
| WO | 2009/001626 A1 | 12/2008 |
| WO | 2010/150466 A1 | 12/2010 |
| WO | 2012/081490 A1 | 6/2012 |
| WO | WO-2013137411 A1 * | 9/2013 ............. C08J 9/18 |
| WO | 2015/107847 A1 | 7/2015 |
| WO | 2016/060162 A1 | 4/2016 |
| WO | 2016/111017 A1 | 7/2016 |

OTHER PUBLICATIONS

International Search Report for PCT/JP2016/070624 dated Oct. 4, 2016; English translation submitted herewith (5 pages).
United States Non-Final Office Action for U.S. Appl. No. 15/111,760 dated Mar. 5, 2018.
Extended European Search Report dated Apr. 5, 2018 to the corresponding European Application No. 16824474.7.
Lieberman, R. and Stewart, C. "Propylene Polymers". Encyclopedia of Polymer Science and Technology (2004), vol. 11, pp. 328-325.

* cited by examiner

PROPYLENE RESIN FOAMED PARTICLE AND FOAMED PARTICLE MOLDED BODY

CROSS-REFERENCE TO RELATED APPLICATIONS

This application is a U.S. national phase application filed under 35 U.S.C. § 371 of International Application PCT/JP2016/070624, filed on Jul. 13, 2016, designating the United States, which claims priority from Japanese Application Number 2015-141333, filed Jul. 15, 2015.

FIELD OF THE INVENTION

The present invention relates to tubular expanded propylene resin beads and an expanded beads molded article having interconnected voids.

BACKGROUND OF THE INVENTION

Expanded thermoplastic resin beads are excellent in lightness in weight, cushioning properties, and heat insulating properties, and expanded beads molded articles having a three-dimensional shape are obtained by means of in-mold molding. The expanded beads molded articles are high in a degree of freedom of shape design, so that they are utilized as a cushioning material, a container, a heat insulating material, a vibration-damping material, or the like in multipurpose fields inclusive of packaging fields, commodities for living, building and civil engineering materials, vehicle members, and the like. The expanded thermoplastic resin beads are roughly classified into those made of a styrene-based resin as a base material resin and those made of an olefin-based resin as a base material resin. Among them, the expanded beads made of a styrene-based resin as a base material resin are used more frequently than the expanded beads made of an olefin-based resin as a base material resin for the reasons that the former is excellent in a balance between lightness in weight and compression strength of the expanded beads molded article, is easy for undergoing in-mold molding of the expanded beads, and is inexpensive in terms of a raw material. But, though the expanded beads made of a styrene-based resin have excellent aspects as described above, they are insufficient in heat resistance, chemical resistance, durability, toughness, and creep resistance characteristics depending upon uses. For that reason, among the expanded beads made of an olefin-based resin, the expanded beads made of a propylene-based resin, which are excellent in heat resistance, chemical resistance, durability, toughness, creep resistance characteristics, and so on, are watched.

In addition, since the expanded propylene resin beads molded articles having voids are excellent in characteristics, such as water permeability, air permeability, sound-deadening qualities, etc., and have appropriate rigidity and elasticity, they are used for building and civil engineering materials, vehicle interior materials, and so on, and their uses are expanded. Furthermore, following the recent expansion of uses, performances required against the expanded propylene resin beads molded articles having voids are being more increased. That is, from the viewpoints of enhancements in characteristics, such as water permeability, air permeability, sound-deadening qualities, etc., expanded beads molded articles having a high voidage are required. Moreover, from the viewpoints of durability, impact resistance, and the like, expanded beads molded articles which are strong in fusion strength among the expanded beads and also excellent in deflection properties are required.

But, there is involved difficulty in the aspect of molding processing, for example, a molding pressure of a heating medium, such as steam, etc., is high due to crystallinity and heat resistance of the propylene-based resin, and hence, an improvement of the in-mold molding method using expanded propylene resin beads is required. In addition, from the standpoint of performances of an expanded beads molded article, the requirements for lightness in weight and high impact energy absorbing performance are increasing.

As the conventional art, for example, PTL 1 discloses that in order to utilize fusion characteristics by a propylene-based resin having a low melting point, thereby decreasing a molding pressure of steam at the time of in-mold molding, while revealing appearance, heat resistance, and mechanical physical properties by a propylene-based resin having a high melting point, the propylene-based resin having a high melting point and the propylene-based resin having a low melting point are mixed under specified conditions. In addition, for example, PTLs 2 and 3 disclose that in order to decrease a molding pressure of steam at the time of in-mold molding of expanded propylene resin beads, expanded propylene resin beads in which a core layer of the expanded bead is covered with a resin having a low melting point are used.

CITATION LIST

Patent Literature

PTL 1: WO 2009/001626 A
PTL 2: JP 2004-68016 A
PTL 3: JP 2012-126816 A

SUMMARY OF INVENTION

In accordance with the expanded propylene resin beads described in PTL 1, by mixing the propylene-based resin having a high melting point and the propylene-based resin having a low melting point under specified conditions, an effect for decreasing a pressure of the heating medium at the time of in-mold molding while keeping the excellent characteristics of the propylene-based resin is obtained to some extent. But, fusion bonding properties of the expanded beads at low temperatures and heat resistance of the propylene-based resin are in a trade-off relationship, so that in the foregoing expanded beads, there was still room for improvement. In addition, in accordance with the expanded propylene resin beads covered with a resin having a low melting point as described in PTLs 2 and 3, it was possible to decrease a pressure of the heating medium at the time of in-mold molding; however, there remained a problem from the viewpoint of secondary expandability of the expanded beads under in-mold molding conditions under which the pressure of the heating medium is low. In addition, in the expanded propylene resin beads molded articles described in PTLs 2 and 3, there was still room for improvement in the rigidity.

An object of the present invention is to provide expanded propylene resin beads which enable in-mold molding to achieve at an extremely low pressure of a heating medium and which are excellent in fusion bonding properties; and an expanded resin beads molded article having interconnected voids, having excellent fusion bonding properties among expanded beads, and exhibiting sufficient mechanical physical properties.

Specifically, the present invention is as follows.

<1> An expanded propylene resin beads including a core layer being in a foamed state, having a tubular shape, and being constituted of a propylene-based resin composition (a) and a cover layer covering the core layer and being constituted of an olefin-based resin (b), the propylene-based resin composition (a) satisfying the following (i) and (ii), and the olefin-based resin (b) satisfying the following (iii) or (iv):

(i) the propylene-based resin composition (a) is a mixture of 75% by weight to 98% by weight of a propylene-based resin (a1) having a melting point of 100° C. to 140° C. and 2% by weight to 25% by weight of a propylene-based resin (a2) having a melting point of 140° C. to 165° C., provided that a sum total weight of the propylene-based resin (a1) and the propylene-based resin (a2) is 100% by weight;

(ii) a difference between the melting point of the propylene-based resin (a2) and the melting point of the propylene-based resin (a1) [(melting point of a2)–(melting point of a1)] is 15° C. or more;

(iii) the olefin-based resin (b) is a crystalline olefin-based resin having a melting point (TmB) that is lower than a melting point (TmA) of the propylene-based resin composition (a), with a difference between the melting point (TmA) and the melting point (TmB) [TmA–TmB] being more than 0° C. and 80° C. or less; and (iv) the olefin-based resin (b) is a non-crystalline olefin-based resin having a softening point (TsB) that is lower than the melting point (TmA) of the propylene-based resin composition (a), with a difference between the melting point (TmA) and the softening point (TsB) [TmA–TsB] being more than 0° C. and 100° C. or less.

<2> The expanded propylene resin beads as set forth in <1>, wherein in the foregoing (ii), the difference in melting point between the propylene-based resin (a2) and the propylene-based resin (a1) [(melting point of a2)–(melting point of a1)] is 15 to 25° C.

<3> The expanded propylene resin beads as set forth in <1> or <2>, wherein the propylene-based resin (a1) is a propylene-based resin obtained through polymerization in the presence of a metallocene-based polymerization catalyst.

<4> The expanded propylene resin beads as set forth in <1> or <2>, wherein the propylene-based resin (a1) and the propylene-based resin (a2) each is a propylene-based resin obtained through polymerization in the presence of a metallocene-based polymerization catalyst.

<5> The expanded propylene resin beads as set forth in any one of <1> to <4>, wherein the propylene-based resin composition (a) has a flexural modulus of 900 MPa to 1,200 MPa.

<6> The expanded propylene resin beads as set forth in any one of <1> to <5>, wherein the propylene-based resin composition (a) has a content of the propylene-based resin (a1) of more than 90% by weight and 98% by weight or less and a content of the propylene-based resin (a2) of 2% by weight or more and less than 10% by weight, provided that a sum total weight of the propylene-based resin (a1) and the propylene-based resin (a2) is 100% by weight <7> The expanded propylene resin beads as set forth in any one of <1> to <6>, wherein the olefin-based resin (b) is an ethylene-based resin obtained through polymerization in the presence of a metallocene-based polymerization catalyst.

<8> The expanded propylene resin beads as set forth in any one of <1> to <7>, wherein the propylene-based resin composition (a) is blended with at least one flame retardant selected from a brominated bisphenol A-based flame retardant, a brominated bisphenol S-based flame retardant, a brominated butadiene-styrene block copolymer flame retardant, and a brominated polyphenyl ether flame retardant.

<9> An expanded propylene resin beads molded article having interconnected voids, which is obtained through in-mold molding of the expanded propylene resin beads as set forth in any one of <1> to <8>.

In accordance with the present invention, it is possible to provide expanded propylene resin beads which enable in-mold molding to achieve at an especially low pressure of a heating medium and which are excellent in fusion bonding properties; and an expanded resin beads molded article having interconnected voids, having excellent fusion bonding properties among expanded beads, and exhibiting sufficient mechanical physical properties.

DESCRIPTION OF EMBODIMENTS

Figure 1:
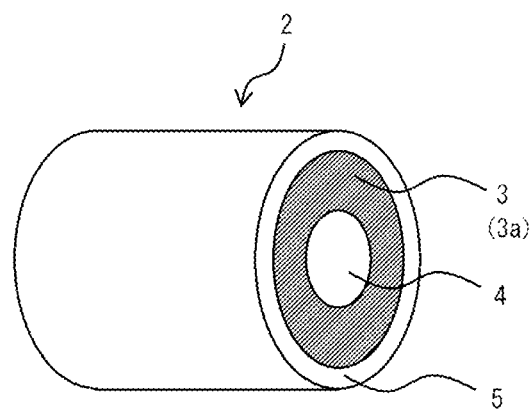
FIG. 1 is a schematic view expressing an example of an expanded propylene resin bead of the present invention, which includes a core layer being in a foamed state, having a tubular shape and being constituted of a propylene-based resin composition and a cover layer covering the core layer and being constituted of an olefin-based resin.
Figure 2A:
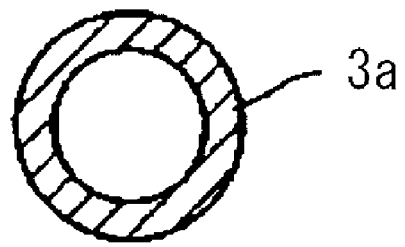
FIG. 2A is a cross-sectional view showing an embodiment of the core layer being in a foamed state and having a tubular shape in the present invention.
Figure 2B:
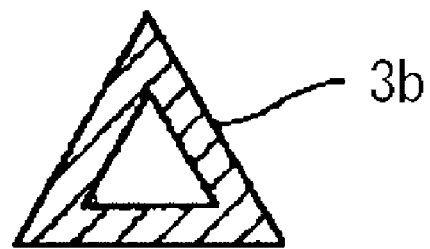
FIG. 2B is a cross-sectional view showing an embodiment of the core layer being in a foamed state and having a tubular shape in the present invention.
Figure 2C:
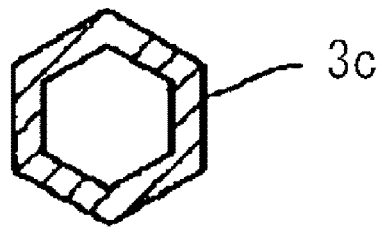
FIG. 2C is a cross-sectional view showing an embodiment of the core layer being in a foamed state and having a tubular shape in the present invention.
Figure 2D:
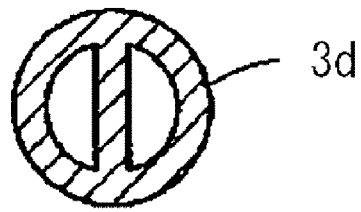
FIG. 2D is a cross-sectional view showing an embodiment of the core layer being in a foamed state and having a tubular shape in the present invention.
Figure 2E:
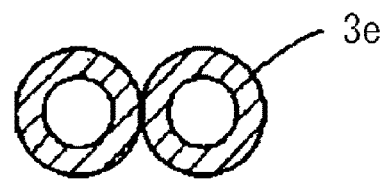
FIG. 2E is a cross-sectional view showing an embodiment of the core layer being in a foamed state and having a tubular shape in the present invention.
Figure 2F:
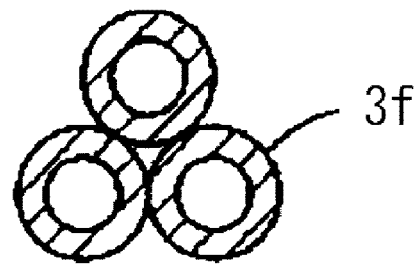
FIG. 2F is a cross-sectional view showing an embodiment of the core layer being in a foamed state and having a tubular shape in the present invention.
Figure 2G:
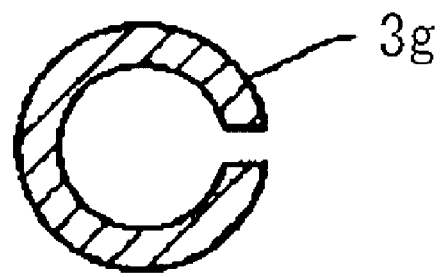
FIG. 2G is a cross-sectional view showing an embodiment of the core layer being in a foamed state and having a tubular shape in the present invention.
Figure 2H:
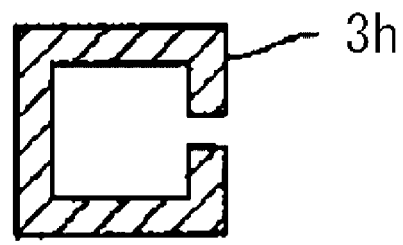
FIG. 2H is a cross-sectional view showing an embodiment of the core layer being in a foamed state and having a tubular shape in the present invention.
Figure 3A:
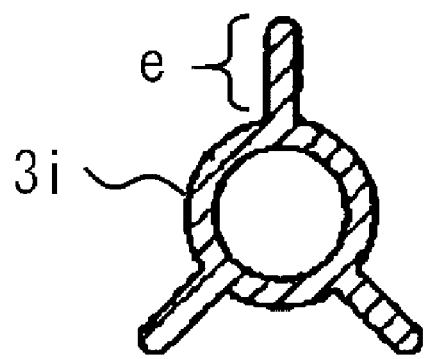
FIG. 3A is a cross-sectional view showing an embodiment of the core layer being in a foamed state and having a tubular shape in the present invention.
Figure 3B:
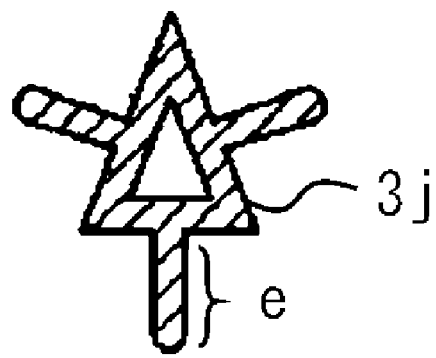
FIG. 3B is a cross-sectional view showing an embodiment of the core layer being in a foamed state and having a tubular shape in the present invention.
Figure 3C:
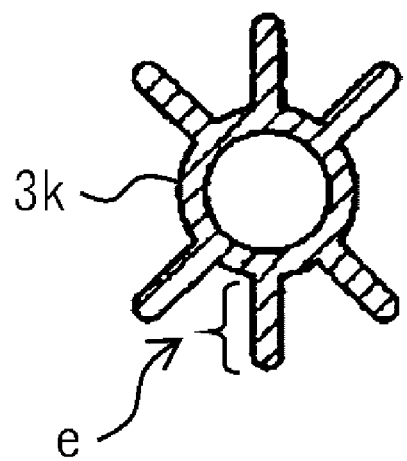
FIG. 3C is a cross-sectional view showing an embodiment of the core layer being in a foamed state and having a tubular shape in the present invention.
Figure 3D:
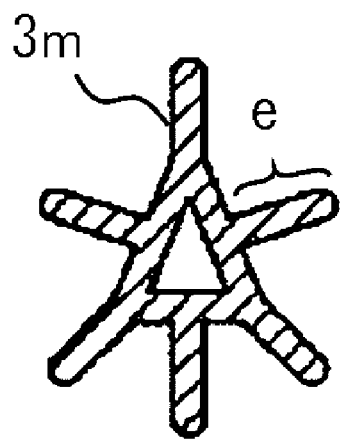
FIG. 3D is a cross-sectional view showing an embodiment of the core layer being in a foamed state and having a tubular shape in the present invention.

The expanded propylene resin beads of the present invention is an expanded propylene resin beads including a core layer being in a foamed state, having a tubular shape, and being constituted of a propylene-based resin composition (a) and a cover layer covering the core layer and being constituted of an olefin-based resin (b), the propylene-based resin composition (a) satisfying the following (i) and (ii), and the olefin-based resin (b) satisfying the following (iii) or (iv):

(i) the propylene-based resin composition (a) is a mixture of 75% by weight to 98% by weight of a propylene-based resin (a1) having a melting point of 100° C. to 140° C. and 2% by weight to 25% by weight of a propylene-based resin (a2) having a melting point of 140° C. to 165° C., provided that a sum total weight of the propylene-based resin (a1) and the propylene-based resin (a2) is 100% by weight;

(ii) a difference between the melting point of the propylene-based resin (a2) and the melting point of the propylene-based resin (a1) [(melting point of a2)−(melting point of a1)] is 15° C. or more;

(iii) the olefin-based resin (b) is a crystalline olefin-based resin having a melting point (TmB) that is lower than a melting point (TmA) of the propylene-based resin composition (a), with a difference between the melting point (TmA) and the melting point (TmB) [TmA−TmB] being more than 0° C. and 80° C. or less; and (iv) the olefin-based resin (b) is a non-crystalline olefin-based resin having a softening point (TsB) that is lower than the melting point (TmA) of the propylene-based resin composition (a), with a difference between the melting point (TmA) and the softening point (TsB) [TmA−TsB] being more than 0° C. and 100° C. or less.

In addition, the expanded propylene resin beads molded article having interconnected voids of the present invention is one obtained through in-mold molding of the expanded propylene resin beads of the present invention.

The following expressions are hereinafter sometimes abbreviated as follows.

Expanded propylene resin beads: expanded beads
Propylene-based resin composition (a): resin composition (a)
Propylene-based resin (a1): resin (a1)
Propylene-based resin (a2): resin (a2)
Olefin-based resin (b): resin (b)
Melting point of propylene-based resin (a1): $Tm_{a1}$
Melting point of propylene-based resin (a2): $Tm_{a2}$
Difference in melting point between propylene-based resin (a2) and propylene-based resin (a1) [$Tm_{a2}-Tm_{a1}$]: $\Delta Tm_{a2-1}$
Difference between melting point (TmA) of propylene-based resin composition (a) and melting point (TmB) of olefin-based resin (b) [TmA−TmB]: $\Delta Tm_{A-B}$
Difference between melting point (TmA) of propylene-based resin composition (a) and softening point (TsB) of olefin-based resin (b) [TmA−TsB]: $\Delta T_{mA-sB}$
Expanded propylene resin beads molded article: expanded beads molded article When the expanded beads of the present invention satisfy the aforementioned constituent features, expanded beads which are excellent in both fusion bonding properties and secondary expandability even by means of in-mold molding under a condition at a low pressure of a heating medium are provided. Then, the expanded beads molded article obtained through in-mold molding of the expanded beads becomes a molded article which exhibits favorable mechanical physical properties, such as compression strength, etc., favorable compression strength, and excellent fusion bonding properties among the expanded beads. In addition, by subjecting the expanded beads of the present invention to in-mold molding, the expanded beads molded article of the present invention may be formed into one, a voidage of which is adjusted high according to the purpose.

As for the excellent effects based on the aforementioned constituent features, the following reasons may be conjectured.

First, the expanded beads of the present invention include a core layer and a cover layer. The melting point (TmB) or softening point (TsB) of the olefin-based resin (b) constituting the cover layer is lower than the melting point (TmA) of the propylene-based resin composition (a) constituting the core layer. In consequence, when the expanded beads molded article is produced using the expanded beads, the olefin-based resin (b) works as an adhesive for fusion bonding the expanded beads to each other, and therefore, an expanded beads molded article which is excellent in fusion bonding properties among the expanded beads even in the case of performing in-mold molding under a condition at a low pressure of the heating medium may be obtained.

Second, the core layer includes as main components at least two propylene-based resins (a1 and a2) having a different melting point from each other, and of the resin (a1) and the resin (a2), the low melting point resin (a1) is included in a larger content than the high melting point resin (a2) within a specified range. Accordingly, it may be considered that even in the expanded beads including the resin (a2) with high mechanical strength, the secondary expandability of the expanded beads at the time of in-mold molding under a condition at a low pressure of the heating medium may be ensured.

That is, according to the aforementioned first and second constituent features, it is possible to distinguish and adjust the behaviors of the fusion bonding properties and the secondary expandability of the expanded beads, which are important in the in-mold molding, by resin composition of the core layer and the cover layer. In consequence, the expanded beads constituted of the propylene-based resin composition (a) including the resin (a2) with high mechanical strength in the core layer have favorable secondary expandability even in the case of performing the in-mold molding under a condition at a low pressure of the heating medium. Furthermore, in view of the fact that the expanded beads are excellent in secondary expandability, the fusion bonding among the expanded beads constituting the expanded beads molded article becomes firmer.

In conventional expanded beads obtained by mixing a high melting point propylene-based resin and a low melting point propylene-based resin, the behaviors of the fusion bonding properties and the secondary expandability of the expanded beads in in-mold molding could not be distinctly adjusted. Accordingly, expanded beads had to be subjected to in-mold molding under a condition at a low pressure of the heating medium while scarifying the mechanical physical properties of the expanded beads, or conversely the mechanical physical properties of the expanded beads had to be enhanced while scarifying the in-mold molding under a condition at a low pressure of the heating medium. In consequence, in the conventional expanded beads obtained by mixing a high melting point propylene-based resin and a low melting point propylene-based resin, it was not fulfilled to fully bring out the both performances. In addition, the conventional expanded beads including a core layer and a cover layer do not have a core layer constituted of a composition including the resin (a1) and the resin (a2) in specified ranges as in the present invention, and therefore, there is involved such a problem that the secondary expandability of expanded beads in in-mold molding under a condition at a low pressure of the heating medium is insufficient as described above.

Third, since the expanded beads of the present invention are a tube-shaped expanded bead, even in the case where a mold shape is complicated, the heating medium sufficiently sneaks even in a detail part among the expanded beads filled within the mold at the time of in-mold molding. Accordingly, it becomes possible to achieve uniform heating of the filled expanded beads, and as a result, it becomes possible to perform in-mold molding under a condition at a lower pressure of the heating medium.

The expanded beads of the present invention and the expanded beads molded article of the present invention are hereunder described in detail.

<Expanded Propylene Resin Beads>

A schematic view expressing an example of an expanded propylene resin bead of the present invention, which includes a core layer being in a foamed state, having a tubular shape, and being constituted of a propylene-based resin composition and a cover layer covering the core layer and being constituted of an olefin-based resin is shown in FIG. 1.

FIG. 1 shows an expanded bead 2 including a tube-shaped core layer 3 having a penetrating tubular hole 4 and a cover layer 5 that covers the cylindrical side face of the core layer 3. In addition, FIGS. 2A to 2H and FIGS. 3A to 3D show cross-sectional views of various modes (3a to 3m) of the core layer 3 being in a foamed state and having a tubular shape in the present invention. In the core layer 3 shown in FIG. 3A and FIG. 3C, three and six limb-like parts e extend, respectively from a round skeleton. In the core layer 3 shown in FIG. 3B and FIG. 3D, three and six limb-like parts e extend, respectively from a triangular skeleton.

In FIG. 1, so far as the purpose and effects of the present invention may be achieved, the expanded bead 2 may include, for example, an interlayer between the core layer 3 and the cover layer 5; however, it is preferred to adjust a thickness of the cover layer 5 thin for the reasons as described later, and hence, it is preferred that the expanded bead 2 includes simply the core layer 3 and the cover layer 5. The cover layer 5 that covers the core layer 3 may not cover the entirety of the periphery of the core layer 3, or for example, the cover layer 5 may cover the core layer 3 in a striped pattern.

In the present invention, the core layer 3 refers to one having a tubular shape, and the tubular shape refers to one having the penetrating tubular hole 4. Specifically, examples thereof include a cylindrical shape, an elliptically cylindrical shape, a rectangular cylindrical shape, and a conjugate shape of tubes having a cross-sectional shape as exemplified in FIG. 2A to FIG. 2H, respectively; and those in which the one or plural limb-like parts e are provided on the periphery of the tube having a cross-sectional shape as exemplified in FIG. 3A to FIG. 3D, respectively. In addition, as for the dimensions of the core layer 3 in the expanded bead of the present invention, preferably, a maximum outer diameter D in the cross section of the core layer in the perpendicular direction to the axial direction (tube axis direction) through which the tubular hole 4 of the core layer 3 penetrates is 3 to 12 mm; a minimum hole diameter $d_{MIN}$ in the cross section of the core layer in the perpendicular direction to the axial direction (tube axis direction) through which the tubular hole 4 penetrates is 1 to 6 mm; and a length of the core layer in the axial direction (tube axis direction) through which the tubular hole 4 penetrates is 2 to 20 mm. The tubular shape of the core layer 3 is not limited to the cross-sectional shapes shown in FIG. 2A to FIG. 2H and FIG. 3A to FIG. 3D, and the cross-sectional shape may also be amorphous so far as it is in a tubular state having the tubular hole 4. In the present invention, the cross-sectional shape of the tube-shaped core layer encompasses an amorphous shape.

Furthermore, it is preferred that the core layer being in a foamed state and having a tubular shape satisfies the following formulae (1) and (2).

$$d_{MIN} \geq 1.0 \text{ (mm)} \tag{1}$$

$$d_{MIN}/D_{MIN} \leq 0.80 \tag{2}$$

In the formulae (1) and (2), $d_{MIN}$ is a minimum hole diameter (mm) in the cross section of the core layer in the perpendicular direction to the axial direction through which the tube-shaped tubular hole penetrates; and $D_{MIN}$ is a minimum outer diameter (mm) of the core layer in a position of the cross-section of the core layer, at which the hole diameter is $d_{MIN}$-hole $D_{MIN}$ and $d_{MIN}$ are described by reference to FIG. 4A to FIG. 4C.

Figure 4A:
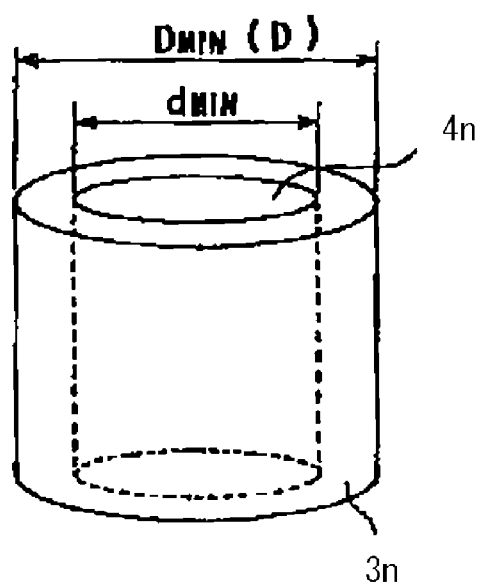
FIG. 4A is a schematic view showing an embodiment of a tubular hole of the tubular shape which the core layer in the present invention has.
Figure 4B:
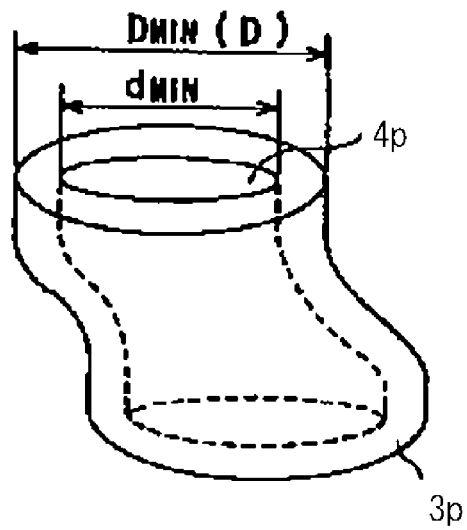
FIG. 4B is a schematic view showing an embodiment of a tubular hole of the tubular shape which the core layer in the present invention has.
Figure 4C:
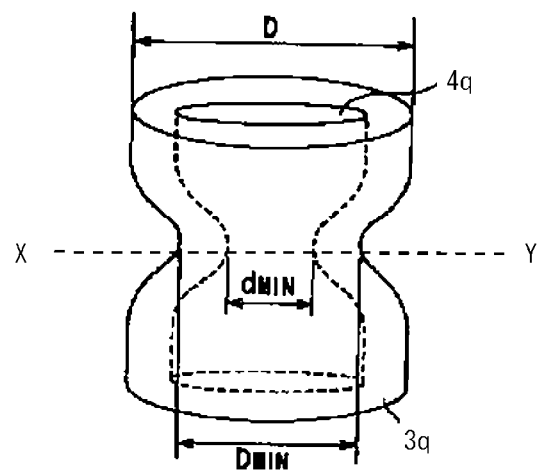
FIG. 4C is a schematic view showing an embodiment of a tubular hole of the tubular shape which the core layer in the present invention has.

FIG. 4A to FIG. 4C each show a schematic view expressing an example of the core layer 3 (3n, 3p, and 3q) and the tube-shaped tubular hole (4n, 4p, and 4q) which the core layer 3 has. FIG. 4A to FIG. 4C are each a schematic view of a tubular shape in which only the core layer 3 and the tubular hole 4 of the expanded bead 2 in FIG. 1 are extracted.

As for the tubular shape of FIG. 4A and FIG. 4B, the outer diameter of the core layer 3 and the hole diameter of the tubular hole 4 do not change, respectively and are a fixed diameter, and the minimum outer diameter of the core layer 3 is $D_{MIN}$, and the minimum diameter of the tubular hole 4 is $d_{MIN}$. The diameter expressed merely as D means the maximum diameter of the core layer 3. In FIG. 4A and FIG. 4B, the minimum outer diameter $D_{MIN}$ is equal to the maximum outer diameter D, and therefore, it is expressed as "$D_{MIN}$ (D)".

In FIG. 4C, the outer diameter of the core layer 3 and the hole diameter of the tubular hole 4 change in the axial direction through which the tubular hole penetrates, and the outer diameter of the core layer 3 and the hole diameter of the tubular hole 4 become minimum on a broken line connected by X to Y. The hole diameter at which this hole diameter becomes minimum, in other words, "the minimum hole diameter in the cross section of the core layer that is the perpendicular direction to the axial direction through which the tube-shaped tubular hole penetrates", is "$d_{MIN}$". Furthermore, the "position of the cross section of the core layer where the hole diameter is $d_{MIN}$" is a position where in FIG. 4C, the broken line connected by X to Y is drawn, and the outer diameter of the core layer 3 in such a position is "$D_{MIN}$" that is the "minimum outer diameter of the core layer".

From the viewpoint of securing the voidage of the expanded beads molded article, the $d_{MIN}$ is preferably 1.0 mm or more [see the formula (1)], more preferably 1.5 mm or more, and still more preferably 2.0 mm or more.

From the viewpoints of enhancing the fusion bonding properties of the expanded beads and enhancing the mechanical physical properties of the expanded beads molded article, the $d_{MIN}/D_{MIN}$ is preferably 0.80 or less [see the formula (2)], and more preferably 0.70 or less.

The $d_{MIN}$ and the $D_{MIN}$ may be determined by measuring the minimum hole diameter and the minimum outer diameter in the cross section to be measured of the expanded bead having a tubular shape, that is subject to the measurement, by using calipers or the like.

The present invention is hereunder described while omitting the symbols of FIGS. 1 to 3.

The core layer includes the propylene-based resin composition (a) and is formed in a foamed state.

The foamed state as referred to herein refers to the matter that the core layer has a cell structure. Specifically, the foamed state means a cell structure that sufficiently contributes to lightness in weight such that the expanded beads have a general apparent density as described later. Whether or not the core layer is in a foamed state may be confirmed by a cross-sectional photograph of the expanded beads.

Meanwhile, though the cover layer that covers the core layer may be either in a foamed state or not in a foamed state, it is preferably in a non-foamed state. When the cover layer is in a non-foamed state, an unnecessary lowering of the strength of an expanded beads molded article can be suppressed. Here, the non-foamed state includes not only the state where cells do not exist in the cover layer at all (also including the state where once formed cells are melt fractured, and the cells vanish) but also a substantially non-foamed state where extremely fine cells are present in a slight amount.

[Propylene-Based Resin Composition (a)]

As for the propylene-based resin composition (a), (i) it is constituted of 75% by weight to 98% by weight of a propylene-based resin (a1) having a melting point of 100° C. to 140° C. and 2% by weight to 25% by weight of a propylene-based resin (a2) having a melting point of 140° C. to 165° C., provided that a sum total weight of the propylene-based resin (a1) and the propylene-based resin (a2) is 100% by weight; and (ii) a difference in melting point between the propylene-based resin (a2) and the propylene-based resin (a1), each constituting the propylene-based resin composition (a) [(melting point of a2)–(melting point of a1)] is 15° C. or more.

Namely, the propylene-based resin composition (a) includes at least the low melting point resin (a1) and the high melting point resin (a2); and the content of the resin (a1) is 75% by weight to 98% by weight, and the content of the resin (a2) is 2% by weight to 25% by weight in 100% by weight of the sum total weight of the resin (a1) and the resin (a2). A melting point $Tm_{a1}$ of the resin (a1) is in a relation of (100° C.$\leq Tm_{a1} \leq$140° C.), a melting point $Tm_{a2}$ of the resin (a2) is in a relation of (140° C.$\leq Tm_{a2} \leq$165° C.), and a difference in melting point therebetween ($\Delta Tm_{a2-1}$) is in a relation of (15° C.$\leq \Delta Tm_{a2-1}$).

So far as the content of resin (a1) on the low melting point side is 75% by weight to 98% by weight in 100% by weight of the sum total weight of the resin (a1) and the resin (a2), even in the expanded beads with relatively high mechanical strength, the secondary expandability of the expanded beads at the time of in-mold molding under a condition of a low pressure of the heating medium is enhanced. Furthermore, this effect for enhancing the secondary expandability is related to the presence of the specified cover layer, too, and the fusion bonding properties of the expanded beads become much more favorable. In addition, the resulting expanded beads molded article exhibits sufficient mechanical strength and is excellent in fusion bonding properties among the expanded beads.

The content of the resin (a1) is preferably 80% by weight to 98% by weight, more preferably 85% by weight to 98% by weight, and especially preferably more than 90% by weight and 98% by weight or less.

The content of the resin (a2) is preferably 2% by weight to 20% by weight, more preferably 2% by weight to 15% by weight, and especially preferably 2% by weight or more and less than 10% by weight.

The propylene-based resin as referred to in the present specification refers to a resin including a propylene-derived constituent unit as a main constituent unit. The main constituent unit as referred to herein means a constituent unit whose content in the resin is more than 50% by weight, and preferably, it means a constituent unit of more than 80% by weight. In addition, the propylene-based resin composition as referred to in the present specification refers to a resin made of, as a main component, a resin made of the propylene-based resin (a1) and the propylene-based resin (a2). The main component as referred to herein means that its content in the resin composition is more than 50% by weight, and preferably more than 80% by weight.

In the present invention, the melting point $Tm_{a1}$ of the low melting point resin (a1) is in a relation of (100° C.$\leq Tm_{a1} \leq$140° C.). When the relation between a specified blending ratio of the resin (a1) and the resin (a2) in the present invention and a specified a difference in melting point of the resin (a1) and the resin (a2) are satisfied at the same time, effects, such as an enhancement in secondary expandability of the expanded beads, etc., are obtained. The $Tm_{a1}$ is preferably (110° C.$\leq Tm_{a1} \leq$140° C.), more preferably (120° C.$\leq Tm_{a1} \leq$140° C.), still more preferably (125° C.$\leq Tm_{a1} \leq$140° C.), and especially preferably (130° C.$\leq Tm_{a1} \leq$140° C.).

The melting point $Tm_{a2}$ of the high melting point resin (a2) is (140° C.$\leq Tm_{a2} \leq$165° C.). When the relation between a specified blending ratio of the resin (a1) and the resin (a2) in the present invention and a specified difference in melting point of the resin (a1) and the resin (a2) are satisfied at the same time, the effects, such as an enhancement of mechanical physical properties of the expanded beads, in its turn the resulting expanded beads molded article, etc., are obtained. The $Tm_{a2}$ is preferably (145° C.$\leq Tm_{a2} \leq$165° C.), more preferably (145° C.$\leq Tm_{a2} \leq$165° C.), still more preferably (150° C.$\leq Tm_{a2} \leq$165° C.), and especially preferably (150° C.$\leq Tm_{a2} \leq$160° C.).

The difference between the melting point of the propylene-based resin (a2) and the melting point of the propylene-based resin (a1) [$Tm_{a2} - Tm_{a1}$] ($\Delta Tm_{a2-1}$) is 15° C. or more. When the $\Delta Tm_{a2-1}$ is 15° C. or more, in cooperation with the conditions, such as the specified blending ratio of the resin (a1) and the resin (a2), etc., the desired purpose regarding the mechanical strength and secondary expandability of the expanded beads is attained. The $\Delta Tm_{a2-1}$ is preferably 15° C. to 30° C., more preferably 15° C. to 25° C., and especially preferably 15° C. to 23° C.

The melting point of the resin is a value as measured under a condition at a heating rate of 10° C./min by the method described in "the case of measuring a fusion temperature after performing a certain heat treatment" in accordance with JIS K7121 (1987) by a heat flux differential scanning calorimetry (heat flux DSC) apparatus. In the case where plural endothermic peaks are present in the DSC curve, a peak top temperature of the endothermic peak having a largest area is defined as the melting point. In addition, in the present specification, the softening point of the resin is measured on the basis of the A50 method of JIS K7206 (1999) by using a Vicat softening tester, TM4123, etc., manufactured by Ueshima Seisakusho Co., Ltd.

MFR of the resin (a1) is preferably 1 g/10 min to 100 g/10 min, more preferably 2 g/10 min to 50 g/10 min, and still more preferably 3 g/10 min to 30 g/10 min.

MFR of the resin (a2) is preferably 0.1 g/10 min to 50 g/10 min, more preferably 0.2 g/10 min to 20 g/10 min, and still more preferably 2 g/10 min to 18 g/10 min.

The MFR of each of the propylene-based resin and the propylene-based resin composition is a value as measured under the test condition M (temperature: 230° C., load: 2.16 kg) in accordance with JIS K7210 (1999). The MFR of the ethylene-based resin is a value as measured under the test condition D (temperature: 190° C., load: 2.16 kg) in accordance with JIS K7210 (1999).

So far as the resin (a1) and the resin (a2) are a propylene-based resin satisfying the aforementioned conditions (i) and (ii), each of the resin (a1) and the resin (a2) may be either a propylene homopolymer or a propylene-based copolymer including a propylene-derived constituent unit and other constituent unit. Here, the propylene-based copolymer contains the propylene-derived constituent unit in the content of preferably 75% by weight or more, and more preferably 90% by weight or more in the copolymer.

The melting point of the resin is controlled by selection of the catalyst species in synthesis of the resin, selection of the copolymer component, adjustment of the content of the copolymer component, adjustment of a degree of crystallization, and so on; however, the selection of the resin (a1) and the resin (a2) may be made by reference to melting points described in brochures of propylene-based resins marketed by raw material manufacturers, or the like. In addition, the resin (a1) may be easily selected from a propylene-based copolymer obtained by a metallocene-based polymerization catalyst.

The propylene-based copolymer is preferably a copolymer of propylene and ethylene or/and an α-olefin having 4 to 20 carbon atoms. The copolymer of propylene and ethylene or/and an α-olefin having 4 to 20 carbon atoms means a copolymer of propylene and ethylene, a copolymer of propylene and an α-olefin having 4 to 20 carbon atom, or a copolymer of propylene, ethylene, and an α-olefin having 4 to 20 carbon atoms. More specifically, a copolymer of propylene and at least one comonomer selected from ethylene, 1-butene, 1-pentene, 1-hexene, 1-octene, 4-methyl-1-butene, 4-methyl-1-pentene, and the like is exemplified. The aforementioned propylene-based copolymer may also be a binary copolymer, such as a propylene-ethylene random copolymer, a propylene-1-butene random copolymer, etc., or a ternary copolymer, such as a propylene-ethylene-butene random terpolymer, etc.

A total content of the comonomer components, such as ethylene or/and an α-olefin having 4 to 20 carbon atoms, etc., is preferably 25% by weight or less, and more preferably 10% by weight or less in the propylene-based copolymer.

From the viewpoints of secondary expandability, mechanical physical properties, and so on of the expanded beads, the resin (a1) is preferably a random copolymer of propylene and ethylene or/and 1-butene. In consequence, preferred specific examples of the resin (a1) include a propylene-ethylene random copolymer, a propylene-1-butene random copolymer, a propylene-ethylene-1-butene random terpolymer, and the like.

In the case where the resin (a1) is a propylene-based random copolymer, from the viewpoints of melting point and mechanical physical properties, a total content of the comonomer components in the resin (a1) is selected within the range of preferably from 0.3% by weight to 10% by weight, and especially preferably from 0.5% by weight to 5% by weight.

Furthermore, as the resin (a1), a propylene-ethylene random copolymer, a propylene-1-butene random copolymer, and a propylene-ethylene-1-butene random copolymer, each of which is, for example, obtained through copolymerization of propylene and a comonomer using a metallocene-based polymerization catalyst, are especially preferred from the viewpoint of obtaining the resin with a low melting point without greatly lowering the mechanical physical properties. In addition, the resin (a1) which is obtained using a metallocene-based polymerization catalyst is especially preferred from the viewpoints that it is excellent in compatibility with the resin (a2) and that the lowering in mechanical physical properties of the resin composition (a) is suppressed.

The resin (a2) may be easily selected among general-purpose propylene-based resins. Examples thereof include a propylene homopolymer and a block copolymer of propylene and ethylene or/and an α-olefin having 4 to 20 carbon atoms, and a total content of the comonomer components is preferably 0.3% by weight to 10% by weight, and more preferably 0.5% by weight to 5% by weight. The resin (a2) is preferably a propylene-based copolymer, and more preferably a random copolymer of propylene and ethylene or/and 1-butene from the standpoints that it is excellent in compatibility with the resin (a1) and that enhancements of mechanical physical properties and secondary expandability of the resulting expanded beads may be expected. Each of the resin (a1) and the resin (a2) is preferably a non-crosslinked propylene-based resin from the viewpoints of recyclability, productivity of the expanded beads, and so on.

As the polymerization catalyst which is used in polymerizing the resin (a1) and the resin (a2), various organometallic complexes having a performance as the polymerization catalyst may be used.

In general, a Ziegler-Natta-based polymerization catalyst, a metallocene-based polymerization catalyst, and the like are used.

The Ziegler-Natta-based polymerization catalyst is an organometallic complex containing titanium, aluminum, magnesium, or the like as a nuclear element, which is partially or wholly modified with an alkyl group.

The metallocene-based polymerization catalyst (also called a homogenous catalyst) is an organometallic complex elemental material containing a transition metal, such as zirconium, titanium, thorium, ruthenium, lanthanum, iron, etc., or boron as a nuclear element, which is modified with a cyclopentane ring or the like.

As the polymerization catalyst, a combination of the aforementioned organometallic complex and a methyl alumoxane, etc., or the like may also be used.

Among those, from the viewpoint of an enhancement in mechanical physical properties of the expanded beads molded article, the polymerization catalyst is preferably a metallocene-based polymerization catalyst, and a propylene-based resin obtained through polymerization of the resin (a1) or the resin (a1) and the resin (a2) in the presence of a metallocene-based polymerization catalyst is preferred.

When the resin (a1) and the resin (a2) are each a propylene-based copolymer, it is preferred that the resin (a1) is a propylene-based random copolymer obtained through polymerization in the presence of a metallocene-based polymerization catalyst, whereas the resin (a2) is a propylene-based copolymer. At that time, the resin (a2) may be a polymer obtained using a metallocene-based polymerization catalyst or may be a polymer obtained using a polymerization catalyst other than a metallocene-based polymerization catalyst.

A flexural modulus of the resin composition (a) is preferably 900 MPa to 1,200 MPa, and more preferably 910 MPa to 1,100 MPa. So far as the flexural modulus of the resin composition (a) falls within the foregoing range, the strength of the expanded beads molded article obtained by molding the expanded beads may be increased.

The flexural modulus of the resin composition (a) may be determined upon preparation of a test piece (test piece dimensions: 80 mm in length, 10 mm in width, 4 mm in thickness) by means of injection molding in accordance with JIS K7171 (2008).

The resin composition (a) constituting the core layer of the expanded beads of the present invention may further contain other resin components, additives, and the like within a range where the effects of the present invention are achieved. In consequence, the core layer constituted of the propylene-based resin composition (a) is not limited to one made of only the propylene-based resin.

Examples of other resin components include ethylene-based resins, such as high density polyethylene, low density polyethylene, linear low density polyethylene, linear very low density polyethylene, an ethylene-vinyl acetate copolymer, an ethylene-acrylic acid copolymer, an ethylene-methacrylic acid copolymer, etc.; styrene-based resins, such as polystyrene, a styrene-maleic anhydride copolymer, etc.; rubbers, such as an ethylene-propylene rubber, an ethylene-1-butene rubber, a propylene-1-butene rubber, an ethylene-propylene-diene rubber, an isoprene rubber, a neoprene rubber, a nitrile rubber, etc.; thermoplastic elastomers, such as a styrene-butadiene-styrene block copolymer, a styrene-isoprene-styrene block copolymer, a hydrogenation product of a styrene-butadiene-styrene block copolymer, a hydrogenation product of a styrene-isoprene-styrene block copolymer, etc.; and the like.

These resins, rubbers, or elastomers may also be used in combination of two or more thereof. In the case where the resin composition (a) contains the aforementioned other resin components, a sum total of other resin components is adjusted to the content of preferably approximately 20 parts by weight or less, more preferably 15 parts by weight or less, and especially preferably 10 parts by weight or less based on 100 parts by weight of a sum total weight of the resin (a1) and the resin (a2).

Examples of the additive include various additives, such as a cell adjusting agent, e.g., zinc borate, etc., an antistatic agent, an electrical conductivity imparting agent, a lubricant, an antioxidant, a UV absorbing agent, a flame retardant, a metal-deactivator, a pigment, a dye, a crystal nucleus agent, an inorganic filler, etc. These may be contained in the resin composition (a), if desired. Although the content of the additive strictly varies with its addition purpose, it is approximately preferably 1 to 25 parts by weight, more preferably 1 to 15 parts by weight, and especially preferably 3 to 15 parts by weight based on 100 parts by weight of a sum total weight of the resin (a1) and the resin (a2).

In the case where the expanded beads molded article of the present invention is used for building and civil engineering materials, vehicle interior members, and the like, among the aforementioned additives, the addition of the flame retardant is important. However, the addition of the flame retardant brings worsening of the in-mold moldability of the expanded beads and disturbs especially the in-mold molding under a condition at a low pressure of a heating medium, an aspect of which is mentioned as the effect of the present invention. In consequence, as for the addition of the flame retardant in the present invention, it is preferred that the resin composition (a) is at least blended with the following flame retardant. Similar to the resin composition (a), the olefin-based resin (b) may be blended with the following flame retardant or the like, too.

Specifically, examples of the flame retardant which is suitably blended in the present invention include a brominated bisphenol A-based flame retardant made of a derivative of tetrabromobisphenol A, such as bis(2,3-dibromopropyl ether)tetrabromobisphenol A, etc.; a brominated bisphenol S-based flame retardant made of a derivative of tetrabromobisphenol S, such as bis(2,3-dibromopropyl ether)tetrabromobisphenol S, etc.; tri(2,3-dibromopropyl) isocyanurate; 2,4,6-tribromophenol allyl ether; brominated polyphenyl ether; a brominated butadiene-styrene block copolymer; and the like.

The resin composition (a) may be further blended with an inorganic flame retardant, such as aluminum hydroxide, magnesium hydroxide, calcium carbonate, calcium aluminate, antimony trioxide, expandable graphite, red phosphorus, etc., if desired. The aforementioned flame retardant may be used either alone or in admixture of two or more thereof.

In particular, in the case where a black pigment, such as carbon black, etc., is included in the resin composition (a), there may be a case where even in the resin composition (a) having the flame retardant blended therewith, the flame retardancy of the expanded beads and the expanded beads molded article are insufficient. However, among the aforementioned flame retardants, when at least one flame retardant selected from a brominated bisphenol A-based flame retardant, a brominated bisphenol S-based flame retardant, a brominated butadiene-styrene block copolymer flame retardant, and a brominated polyphenyl ether flame retardant (inclusive of a composite flame retardant in which other flame retardant than a brominated bisphenol A-based flame retardant, a brominated bisphenol S-based flame retardant, a brominated butadiene-styrene block copolymer flame retardant, and a brominated polyphenyl ether flame retardant is compounded) is blended in the resin composition (a), sufficient flame retardancy may be revealed.

The resin composition (a) may be, for example, obtained by charging a kneading machine with the resin (a1) and the resin (a2) as well as other resin components and additives which may be contained, if desired, followed by mixing.

At that time, it is preferred to perform the mixing such that the resin (a1) and the resin (a2) are thoroughly homogeneously mixed. In general, it is preferred to perform the mixing of the resin (a1) and the resin (a2) by heating at a temperature at which the both resins are melted and kneading the resultant by an extruder with high kneading properties, such as a twin-screw kneader, etc. It is preferred to knead the resins with an extruder by adopting a molding method in a starvation mode as described in, for example, JP 2006-69143 A. It is preferred that after kneading the resin (a1) and the resin (a2), the kneaded material is laminated and combined with a molten material of the resin (b) as described later within a coextrusion die and coextruded in a string-like form having a tubular shape from nozzles of the die, and the resultant is cut in a proper length, followed by granulation into resin beads having a suitable size while taking into consideration the size of the finally obtained expanded beads.

Next, the cover layer of the expanded beads is explained.

The cover layer is a layer that covers the core layer and is constituted of the olefin-based resin (b).

The olefin-based resin (b) satisfies the following (iii) or (iv).

That is, the olefin-based resin (b) is crystalline or non-crystalline.

When the olefin-based resin (b) is a crystalline olefin-based resin, (iii) the olefin-based resin (b) has a melting point (TmB) that is lower than a melting point (TmA) of the propylene-based resin composition (a), with a difference between the melting point (TmA) and the melting point (TmB) [TmA−TmB] ($\Delta Tm_{A-B}$) being more than 0° C. and 80° C. or less.

When the olefin-based resin (b) is a non-crystalline olefin-based resin, (iv) the olefin-based resin (b) has a softening point (TsB) that is lower than the melting point (TmA) of the propylene-based resin composition (a), with a difference between the melting point (TmA) and the softening point (TsB) [TmA−TsB] ($\Delta T_{mA-sB}$) being more than 0° C. and 100° C. or less.

The softening point (TsB) or melting point (TmB) of the resin (b) is lower than the melting point (TmA) of the resin composition (a), and hence, when performing in-mold molding using the expanded beads, the resin (b) is excellent in fusion bonding properties of the expanded beads.

In the case where the resin (b) is a crystalline olefin-based resin, when the $\Delta Tm_{A-B}$ is in a relation of (0° C.<$\Delta Tm_{A-B}$≤80° C.), the resin (b) is excellent in fusion bonding properties among the expanded beads.

The $\Delta Tm_{A-B}$ is in a relation of preferably (5° C.≤$\Delta Tm_{A-B}$≤60° C.), more preferably (7° C.≤$\Delta Tm_{A-B}$≤50° C.), and especially preferably (10° C.≤$\Delta Tm_{A-B}$≤40° C.).

In the case where the resin (b) is a non-crystalline olefin-based resin, when the $\Delta T_{mA-sB}$ is in a relation of (0° C.<$\Delta T_{mA-sB}$≤100° C.), the resin (b) is excellent in fusion bonding properties of the expanded beads.

The $\Delta T_{mA-sB}$ is in a relation of preferably (10° C.≤$\Delta T_{mA-sB}$≤80° C.), more preferably (15° C.≤$\Delta T_{mA-sB}$≤75° C.), and especially preferably (20° C.≤$\Delta T_{mA-sB}$≤70° C.).

In the case where the value of $\Delta Tm_{A-B}$, or the value of $\Delta T_{mA-sB}$, is excessively large, there is a concern that inconvenience called as so-called blocking such that the plural expanded beads are fused at the time of expanded beads production, and a lump in which voids are formed among the fused expanded beads is formed is generated. In addition, in the case where the value of $\Delta Tm_{A-B}$, or the value of $\Delta T_{mA-sB}$, is excessively large, worsening of heat resistance of the expanded beads molded article is caused. On the other hand, in the case where the value of $\Delta Tm_{A-B}$, or the value of $\Delta T_{mA-sB}$, is 0° C. or less, the desire purpose may not be achieved.

[Olefin-Based Resin (b)]

The olefin-based resin (b) as referred to in the present invention refers to a resin including a constituent unit derived from ethylene and/or a constituent unit derived from an α-olefin, such as propylene, 1-butene, etc., as a main constituent unit. The main constituent unit as referred to herein means a constituent unit whose content in the resin is more than 50% by weight, and preferably, it means a constituent unit of more than 80% by weight.

Examples thereof include (b1) a homopolymer of ethylene or an α-olefin, (b2) a copolymer of two or more monomer components selected from ethylene and an α-olefin, (b3) a copolymer made of ethylene or/and an α-olefin and other monomer component, such as styrene, etc., and the like. The copolymer may be either a random copolymer or a block copolymer. When the resin (b) is a copolymer, a total content of constituent units derived from ethylene and an α-olefin in the copolymer is preferably 70% by weight or more, and more preferably 80% by weight or more.

Whether the resin (b) is crystalline or non-crystalline may be confirmed from a DSC curve obtained by using the resin (b) as a sample and performing the heat flux differential scanning calorimetry. When the resin (b) is crystalline, an endothermic peak appears on the DSC curve, whereas when the resin (b) is non-crystalline, an endothermic peak does not appear on the DSC curve.

Examples of the homopolymer (b1) of ethylene or an α-olefin include an ethylene resin, a propylene resin, and the like.

Examples of the copolymer (b2) of two or more components selected from ethylene and an α-olefin include a propylene-ethylene copolymer, a propylene-1-butene copolymer, a propylene-ethylene-1-butene copolymer, an ethylene-1-pentene copolymer, an ethylene-1-hexene copolymer, an ethylene-4-methyl-1-pentene copolymer, and the like.

Examples of the copolymer (b3) including ethylene or/and an α-olefin and other monomer component, such as styrene, etc., include an ethylene-styrene copolymer, an ethylene-vinyl acetate copolymer, and the like.

In (b2), it is preferred that at least one of an ethylene-derived constituent unit and a propylene-derived constituent unit is included. In (b3), the constituent unit derived from ethylene or/and an α-olefin is preferably an ethylene-derived constituent unit or/and a propylene-derived constituent unit.

The resin (b) may be polymerized by using a variety of polymerization catalysts. Examples of the polymerization catalyst include the Ziegler-Natta-based polymerization catalyst and the metallocene-based polymerization catalyst, each of which may be used for the synthesis of the resin (a1) and the resin (a2), and the like. Among the aforementioned polymerization catalysts, the metallocene-based polymerization catalyst is preferred from the viewpoint of the fact that a low melting point or low softening point olefin-based resin with excellent fusion bonding properties is obtained.

The resin (b) is especially preferably a propylene-based resin obtained through polymerization in the presence of a metallocene-based polymerization catalyst from the viewpoints of fusion bonding properties and mechanical strength of the expanded beads. In addition, the resin (b) is most preferably an ethylene-based resin obtained through polymerization in the presence of a metallocene-based polymerization catalyst from the viewpoint of fusion bonding properties of the expanded beads.

The propylene-based resin as referred to in the resin (b) means the (co)polymers (b1) to (b3) including a propylene-derived constituent unit as a main constituent unit. Among those, the copolymer (b2) is preferred, and a propylene-ethylene copolymer is more preferred.

The ethylene-based resin as referred to in the resin (b) means the (co)polymers (b1) to (b3) including an ethylene-derived constituent unit as a main constituent unit. Among those, the copolymer (b2) is preferred, and linear low density polyethylene and linear very low density polyethylene are more preferred.

The resin (b) constituting the cover layer of the expanded beads of the present invention may further contain other resin components, additives, and the like as explained as components which the resin composition (a) may include so far as the effects of the present invention are achieved. In consequence, the cover layer constituted of the resin (b) is not limited to one made of only the resin (b).

The content of other resin components in the cover layer is adjusted to preferably approximately 20 parts by weight or less, more preferably 15 parts by weight or less, and especially preferably 10 parts by weight or less in total based on 100 parts by weight of the resin (b). Although the content of the additive in the cover layer varies with its addition purpose, it is adjusted to preferably 25 parts by weight or less, more preferably 20 parts by weight or less, still more preferably 15 parts by weight or less, and especially preferably 8 parts by weight or less based on 100 parts by weight of the resin (b).

In the expanded beads of the present invention, a thickness of the cover layer is preferably 1 µm to 50 µm, more preferably 2 µm to 20 µm, and especially preferably 3 µm to 10 µm from the viewpoints of fusion bonding properties at the time of in-mold molding and mechanical physical properties of the resulting expanded beads molded article.

[Production of Expanded Beads]

As for the production method of the expanded beads of the present invention, the expanded beads may be produced by producing multi-layered resin beads including a core layer having a tubular shape and a cover layer even in resin beads for the purpose of obtaining expanded beads and expanding the core layer in the resulting multi-layered resin beads. In this case, by making a thickness of the cover layer of the resin beads smaller than an average cell diameter of the expanded beads as described later, the expansion of the cover layer may be suppressed in an expansion step of the multi-layered resin beads.

The aforementioned multi-layered resin beads may be produced by a known method. For example, the multi-layered resin beads may be obtained through a combination of a production method of resin beads using a die having a nozzle shape the same as the desired cross-sectional shape as in each of the shapes shown in FIGS. 2 and 3 of the present specification, as described in JP 8-108441 A; and a production method of resin beads having a core layer and a cover layer by a coextrusion method as described in JP 41-16125 B, JP 43-23858 B, JP 44-29522 B, JP 60-185816 A, etc. In general, a core layer-forming extruder and a cover layer-forming extruder are connected with a coextrusion die; the required resins and optionally, an additive are melt kneaded by the core layer-forming extruder; and the required resins and optionally, an additive are also melt kneaded by the cover layer-forming extruder. The respective melt kneaded materials are combined within the aforementioned die installed in a tip of the extruders, to form a multi-layered structure composed of a core layer and a cover layer covering the outer surface of the core layer, and the resultant is coextruded in a strand-like form from the die having nozzles having a desired cross-sectional shape and then cut by a pelletizer such that the weight of the resin beads becomes a predetermined weight, thereby producing multi-layered resin beads having a tubular shape.

The shape of the multi-layered resin beads to be used in the present invention is a tubular shape, such as a cylindrical shape, an elliptically cylindrical shape, a rectangular cylindrical shape, and a conjugate shape of tubes. The expanded beads obtained through expansion of such multi-layered resin beads become a shape approximately corresponding to the shape of the resin beads before the expansion.

An average weight per one multi-layered resin bead is preferably 0.05 mg to 10.0 mg, and especially preferably 0.1 mg to 5.0 mg. The average weight of the expanded beads may be adjusted by allowing the average weight per one resin bead for the purpose of obtaining the expanded beads to conform to an average weight per one desired expanded bead. The average weight per one expanded bead is preferably 0.05 mg to 10.0 mg, and especially preferably 0.1 mg to 5.0 mg from the viewpoint of in-mold moldability.

In the multi-layered resin beads of the present invention, a weight ratio of the core layer and the cover layer ((core layer)/(cover layer)) is approximately 99.7/0.3 to 75/25, preferably 98/2 to 80/20, more preferably 97/3 to 85/15, and still more preferably 97/3 to 90/10.

In view of the fact that the weight ratio of the cover layer of the multi-layered resin beads falls within the foregoing range, the resulting expanded beads are excellent in fusion bonding properties at the time of in-mold molding, and the mechanical physical properties of the resulting expanded beads molded article become especially favorable.

The thickness of the cover layer of the multi-layered resin beads of the present invention is preferably thinner from the viewpoint that when the multi-layered resin beads are expanded, cells may be made to be hardly produced in the cover layer, so that the mechanical physical properties of the finally obtained expanded beads molded article are enhanced. Meanwhile, it is preferred to take into consideration a lower limit of the thickness from the viewpoint of an improving effect of fusion bonding properties of the resulting expanded beads. In consequence, the thickness of the cover layer of the multi-layered resin beads is preferably 1 µm to 50 µm, more preferably 2 µm to 20 µm, and especially preferably 3 µm to 10 µm.

The thickness of the cover layer of the aforementioned multi-layered resin beads is measured in the following manner. First, the multi-layered resin bead is divided into two equal parts so as to obtain a cross section, the entirety of which is surrounded by the cover layer, and an enlarged photograph is taken under observation with a microscope such that the entirety of the cross section is fitted thereinto. Subsequently, a straight line is drawn on the photograph such that the cross section is divided into two substantially equal parts; and a straight line that intersects at right angles with the foregoing straight line and goes through a center of the resin bead is drawn. Then, a length of each of four portions of the cover layer through which these straight lines go is determined; and an arithmetic mean thereof is defined as the thickness of the cover layer of one multi-layered resin bead. Those operations are performed on ten multi-layered resin beads as extracted at random, and a value obtained by performing the arithmetic mean of the thickness of the cover layer of the ten multi-layered resin beads is defined as the thickness of the cover layer of the multi-layered resin beads in the present specification. The thickness of the cover layer part of the expanded bead is also measured by the same method. When the thickness of the cover layer of the multi-layered resin beads or expanded beads is hardly discriminated, the thickness of the cover layer may be measured through production of the multi-layered resin beads by previously adding a coloring agent to the resin constituting the cover layer.

The expanded beads of the present invention is produced by dispersing the aforementioned multi-layered resin beads including a core layer and a cover layer in an aqueous medium (generally water) in a pressurizable closed vessel (for example, an autoclave); adding a dispersant to the aqueous medium; putting a prescribed amount of a blowing agent into the closed vessel under pressure; stirring the contents at a high temperature under a high pressure to impregnate the resin beads with the blowing agent; and releasing the resulting contents together with the aqueous medium from the inside of the pressurized vessel into a low-pressure zone (generally under atmospheric pressure)

that is lower than an inside pressure of the vessel, thereby performing the expansion (this method will be hereinafter referred to as "dispersing medium releasing expansion method"). It is preferred to release the expandable beads by applying a back pressure (pressure) to the inside of the vessel at this time of release. The method of obtaining the expanded beads of the present invention is not limited to the aforementioned method of expanding the multi-layered resin beads, and for example, there may be considered a method of expanding the resin beads made of, as a base material, the resin composition (a) constituting the core layer by the dispersing medium releasing expansion method to produce expanded beads and covering a resin powder made of the resin (b) on the resulting expanded beads, and so on.

In particular, in obtaining expanded beads with a high expansion ratio, the expanded beads obtained by the aforementioned method are aged under atmospheric pressure in a generally adopted manner, the expanded beads are then stored in a pressurizable closed vessel, and a gas, such as air, etc., is put into the vessel under pressure to perform a pressurizing treatment, thereby performing an operation of increasing an internal pressure of the expanded beads. Thereafter, the expanded beads are discharged from the inside of the vessel and again expanded upon heating with a heating medium, such as steam, hot air, etc., whereby the expanded beads with a high expansion ratio may be obtained (this method will be hereinafter referred to as "two-stage expansion method").

The blowing agent is preferably a physical blowing agent. Although the physical blowing agent is not particularly limited, for example, organic physical blowing agents, such as aliphatic hydrocarbons, e.g., n-butane, isobutane, and a mixture thereof, n-pentane, isopentane, n-hexane, etc., and halogenated hydrocarbons, e.g., ethyl chloride, 2,3,3,3-tetrafluoro-1-propene, trans-1,3,3,3-tetrafluoro-1-propene, etc.; and inorganic physical blowing agents, such as carbon dioxide, nitrogen, air, water, etc., may be used solely or in admixture of two or more thereof. Among those blowing agents, a blowing agent containing, as a main component, an inorganic physical blowing agent, such as carbon dioxide, nitrogen, air, etc., is preferably used, and carbon dioxide is more preferably used. The terms "containing, as a main component, an inorganic physical blowing agent" as referred to herein mean that the inorganic physical blowing agent is contained in the content of 50 mol % or more, preferably 70 mol % or more, and more preferably 90 mol % or more based on 100 mol % of the whole of the physical blowing agent. In the case of using an organic physical blowing agent or a combination of an inorganic physical blowing agent and an organic physical blowing agent, it is preferred to use n-butane, isobutane, n-pentane, or isopentane as the organic physical blowing agent from the viewpoints of compatibility with the olefin-based resin and expandability.

The addition amount of the aforementioned physical blowing agent is properly selected according to the kind of the propylene-based resin, the kind of the blowing agent, the apparent density of the desired expanded beads, and so on and cannot be unequivocally limited. However, for example, in the case of using carbon dioxide as the physical blowing agent, the carbon dioxide is used in an amount of 0.1 parts by weight to 30 parts by weight, preferably 0.5 parts by weight to 15 parts by weight, and more preferably 1 part by weight to 10 parts by weight based on 100 parts by weight of the propylene-based resin.

Examples of the dispersant include inorganic materials which are sparingly soluble in water, such as aluminum oxide, calcium tertiary phosphate, magnesium pyrophosphate, zinc oxide, kaolin, mica, etc.; water-soluble polymer-based protective colloid agents, such as polyvinylpyrrolidone, polyvinyl alcohol, methyl cellulose, etc.; and the like. In addition, anionic surfactants, such as sodium dodecylbenzenesulfonate, a sodium alkanesulfonate, etc., and the like may also be used.

In dispersing the multi-layered resin beads in an aqueous medium and heating in the aforementioned dispersing medium releasing expansion method, it is preferred that the temperature is increased to an arbitrary temperature (Ta) within a range of a temperature that is lower by 20° C. than the melting point (Tm) of the resin composition (a) (Tm−20° C.) or higher and lower than a melt completion temperature (Te) of the resin composition (a); that temperature (Ta) is held for a sufficient time, preferably about 10 minutes to 60 minutes; thereafter, the resultant is heated to an arbitrary temperature (Tb) within a range of from a temperature that is lower by 15° C. than the melting point (Tm) (Tm−15° C.) to a temperature that is higher by 10° C. than the melt completion temperature (Te+10° C.); and the multi-layered resin beads are released from the inside of the closed vessel under a low pressure to achieve the expansion.

The heating rate in the aforementioned expansion step of 0.5° C./min to 5° C./min is usually adopted.

The above-explained temperature adjustment range at the time of expanding the resin beads is an appropriate temperature range in the case of using the inorganic physical blowing agent as the blowing agent. In the case where the organic physical blowing agent is used in combination, each of the appropriate temperature ranges tends to be shifted to the lower temperature side than the aforementioned temperature range depending on the kind or use amount thereof due to a plasticizing effect of the organic physical blowing agent against the base resin.

The expanded beads of the present invention obtained by the aforementioned method has a structure in which a core layer being in a foamed state and having a large number of cells and a cover layer on the surface thereof are formed. An apparent density of the whole of the expanded beads of the foregoing structure is usually in the range of from 15 g/L to 300 g/L, and it is preferably 20 g/L to 150 g/L, more preferably 25 g/L to 120 g/L, and especially preferably 30 g/L to 100 g/L from the standpoint of physical properties of the resulting expanded beads molded article, and so on.

The apparent density of the expanded beads is measured in the following manner. The apparent density is determined by sinking a group of expanded beads having a weight W (g) within a graduated cylinder having water charged therein by using a wire net or the like, determining a volume V (L) of the group of expanded beads from an increase of a water level, and dividing the weight of the group of expanded beads by the volume of the group of expanded beads (W/V).

An average cell diameter of the expanded beads of the present invention is preferably 50 μm to 900 μm from the viewpoints of dimensional stability at the time of in-mold molding, mold pattern transferability, and so on. The lower limit of the average cell diameter is more preferably 80 μm, and especially preferably 100 μm from the viewpoints of dimensional stability of the resulting expanded molded article and so on. Meanwhile, the upper limit thereof is more preferably 500 μm, still more preferably 300 μm, and especially preferably 250 μm from the viewpoints of an appearance of the resulting expanded molded article and so on.

The average cell diameter of the expanded beads is measured in the following manner. First, a photograph is taken by dividing the expanded bead into two equal parts to obtain a cross section and enlarging the cross section under observation with a microscope such that the entirety of the cross section is fitted thereinto. A straight line is drawn on the taken photograph such that the cross section is divided into two substantially equal parts; and a value obtained by dividing a length of a line segment from the periphery of the expanded bead to the opposite periphery thereof by a number of all cells intersecting with the line segment is defined as the average cell diameter of one expanded bead. Those operations are performed on twenty expanded beads as extracted at random, and a value obtained by performing the arithmetic mean of the average cell diameters of the twenty expanded beads is defined as the average cell diameter of the expanded beads in the present specification.

<Expanded Propylene Resin Beads Molded Article>

The expanded propylene resin beads molded article of the present invention is one resulting from in-mold molding of the expanded propylene resin beads and having interconnected voids.

Figure 5:
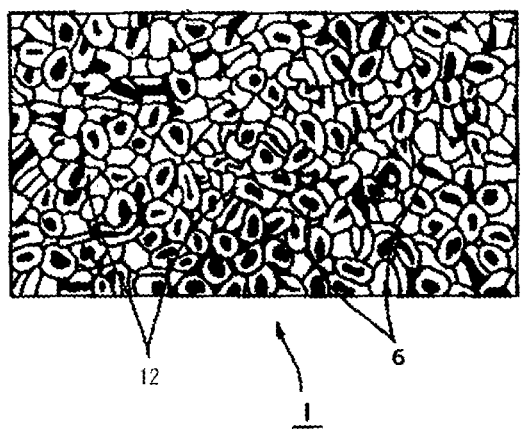
FIG. 5 is a schematic view showing an example of a state of a surface of the expanded propylene resin beads molded article having interconnected voids of the present invention.

FIG. 5 is a schematic view showing an example of a state of a surface of the expanded propylene resin beads molded article having interconnected voids of the present invention. In FIG. 5, an expanded beads molded article 1 having plural expanded beads 12 and interconnected voids 6 is shown. In this way, the expanded propylene resin beads molded article having interconnected voids of the present invention has an appearance having the voids 6 as represented by FIG. 5 and is one resulting from in-mold molding of the expanded propylene resin beads of the present invention as described previously.

The production method of the expanded beads molded article resulting from in-mold molding of the expanded beads of the present invention may be produced by a known in-mold molding method.

For example, the expanded beads molded article may be produced through molding by a cracking molding method in which in order to subject the expanded beads to in-mold molding, a pair of molds for molding is used, the expanded beads are filled in a cavity of the molds under atmospheric pressure or reduced pressure and subjected to mold clamping and compressed such that the volume of the cavity of the molds is reduced by 5% by volume to 50% by volume, and subsequently, a heating medium, such as steam, etc., is fed into the inside of the molds, thereby achieving heat fusion bonding of the expanded beads (for example, JP 46-38359 B). The expanded beads molded article may also be produced through molding by a pressure molding method in which the expanded beads are pressurized with a pressurized gas, such as air, etc., to increase the pressure within the expanded beads, the expanded beads are filled into the cavity of molds under atmospheric pressure or reduced pressure and subjected to mold clamping, and subsequently, a heating medium, such as steam, etc., is fed into the inside of molds, thereby achieving heat fusion bonding of the expanded beads (for example, JP 51-22951 B) or the like. Furthermore, the expanded beads molded article may also be produced through molding by a compression filling molding method in which the expanded beads are filled into the cavity of molds having been pressurized to atmospheric pressure or more with a compressed gas while pressurizing the expanded beads to the foregoing pressure or more, and thereafter, a heating medium, such as steam, etc., is fed into the inside of molds, thereby achieving heat fusion bonding of the expanded beads (for example, JP 4-46217 B). Besides, the expanded beads molded article may also be produced through molding by an ambient pressure filling molding method in which the expanded beads are filled within a cavity of a pair of molds for molding under atmospheric pressure, and subsequently, a heating medium, such as steam, etc., is fed into the molds, thereby achieving heat fusion bonding of the expanded beads (for example, JP 6-49795 B), or a combined method of the aforementioned methods (for example, JP 6-22919 B), or the like.

Although a density of the expanded beads molded article which is produced through in-mold molding of the expanded beads of the present invention may be arbitrarily set up according to the purpose, it is in the range of typically from 12 g/L to 180 g/L, and preferably from 15 g/L to 75 g/L.

The density of the expanded beads molded article is calculated by dividing a weight (g) of a test piece cut out from the molded article by a volume (L) determined from the outside dimensions of the test piece.

The voidage of the expanded beads molded article of the present invention is preferably 7 to 50%, more preferably 10 to 45%, and especially preferably 15 to 40%.

The voidage of the expanded beads molded article is determined by the following manner. That is, a cubic test piece cut out from the expanded beads molded article is sunken in a vessel having an alcohol charged therein; a true volume Vt ($cm^3$) of the test piece is determined from an increase of a liquid level of the alcohol; an apparent volume Va ($cm^3$) is determined from the outside dimensions (length×width×height) of the test piece; and the voidage is then determined from the determined true volume Vt and apparent volume Va on the basis of the following equation.

$$\text{Voidage (\%)} = [(Va-Vt)/Va] \times 100$$

The expanded beads molded article of the present invention is excellent in fusion bonding properties among the expanded beads, is provided with desired characteristics due to the interconnected voids, such as air permeability, water permeability, sound-absorbing qualities, sound-deadening qualities, vibration-damping properties, etc., and is also excellent in mechanical physical properties.

EXAMPLES

Next, the present invention is described in more detail by reference to Examples, but it should be construed that the present invention is by no means limited by these Examples and evaluated physical properties.

Examples 1 to 5, Comparative Example 1, and Comparative Example 2

1. Selection of Low Melting Point Propylene-Based Resin for Core Layer (Resin a1)

(1) Low Melting Point Propylene-Based Resin 1

An ethylene-propylene random copolymer (ethylene content: 2.8% by weight, melting point: 135° C., MFR=8 g/10 min) having been polymerized in the presence of a metallocene-based polymerization catalyst was used.

(2) Low Melting Point Propylene-Based Resin 2

An ethylene-propylene random copolymer (ethylene content: 2.6% by weight, melting point: 137° C., MFR=7 g/10 min) having been polymerized in the presence of a metallocene-based polymerization catalyst was used.

(3) Low Melting Point Propylene-Based Resin 3

An ethylene-propylene random copolymer (ethylene content: 4.0% by weight, melting point: 138° C., MFR=8 g/10 min) having been polymerized in the presence of a Ziegler-Natta-based polymerization catalyst was used.

2. Selection of High Melting Point Propylene-Based Resin for Core Layer (Resin a2):

(1) High Melting Point Propylene-Based Resin 1

An ethylene-propylene random copolymer (ethylene content: 1.0% by weight, melting point: 156° C., MFR=7 g/10 min) having been polymerized in the presence of a Ziegler-Natta-based polymerization catalyst was used.

(2) High Melting Point Propylene-Based Resin 2

An ethylene-propylene random copolymer (ethylene content: 1.1% by weight, melting point: 153° C., MFR=6 g/10 min) having been polymerized in the presence of a Ziegler-Natta-based polymerization catalyst was used.

(3) High Melting Point Propylene-Based Resin 3

A homopropylene polymer (melting point: 163° C., MFR=20 g/10 min) having been polymerized in the presence of a Ziegler-Natta-based polymerization catalyst was used.

(4) High Melting Point Propylene-Based Resin 4

An ethylene-propylene random copolymer (ethylene content: 2.2% by weight, melting point: 146° C., MFR=7 g/10 min) having been polymerized in the presence of a metallocene-based polymerization catalyst was used.

3. Selection of Olefin-Based Resin for Cover Layer (1) Olefin-Based Resin 1

A crystalline ethylene-propylene random copolymer (ethylene content: 3.5% by weight, melting point: 125° C., MFR=7 g/10 min) having been polymerized in the presence of a metallocene-based polymerization catalyst was used.

(2) Olefin-Based Resin 2

A crystalline linear low density polyethylene polymer (melting point: 100° C., MFR=10 g/10 min) having been polymerized in the presence of a metallocene-based polymerization catalyst was used.

<Measurement Methods>

1. Melting Points of Resin and Resin Composition

The melting point of each of the resin and the resin composition was measured with respect to a sample of 1 to 3 mg by means of heat flux DSC by the method described in "the case of measuring a fusion temperature after performing a certain heat treatment" in accordance with JIS K7121 (1987) by using a DSC measurement apparatus (DSC Q1000), manufactured by TA Instruments. The measurement was performed by heating from ambient temperature to 200° C. at a heating rate of 10° C./min.

2. Apparent Density of Expanded Beads

The apparent density was determined by taking out the expanded beads from a group of expanded beads at random, sinking the expanded beads group having a weight W (g) in water of a 1-liter capacity graduated cylinder having water charged therein by using a wire net, determining a volume V (L) of the expanded beads group from an increase of a water level, and dividing the weight of the expanded beads group by the volume of the expanded beads group (W/V). The measurement was performed with respect to the expanded beads obtained by aging under atmospheric pressure at a temperature of 23° C. and at a relative humidity of 50% for 48 hours.

3. Density of Molded Article

The density of the expanded beads molded article was calculated by dividing a weight (g) of a test piece cut out from the molded article by a volume (L) determined from the outside dimensions of the test piece. The measurement was performed with respect to the expanded beads molded article obtained by aging under atmospheric pressure at a temperature of 23° C. and at a relative humidity of 50% for 48 hours.

4. Flexural Modulus of Core Layer Resin Composition (Mixed Resin)

A core layer resin composition (mixed resin) obtained by a method as described later was measured for the flexural modulus in accordance with JIS K7171 (2008). A tensilon universal tester, RTF-1350, manufactured by A&D Company, Limited was used as a measuring device.

5. Voidage of Expanded Beads Molded Article

A cubic test piece cut out from the expanded beads molded article was sunken in a vessel having an alcohol charged therein, and a true volume Vt ($cm^3$) of the test piece was determined from an increase of a liquid level of the alcohol. In addition, an apparent volume Va ($cm^3$) was determined from the outside dimensions (length×width×height) of the test piece. The voidage of the expanded beads molded article was determined from the determined true volume Vt and apparent volume Va on the basis of the following equation. The measurement was performed with respect to the expanded beads molded article obtained by aging under atmospheric pressure at a temperature of 23° C. and at a relative humidity of 50% for 48 hours.

Voidage (%)=[(Va−Vt)/Va]×100

<Evaluation Methods>

1. Fusion Bonding Properties of Expanded Beads

The expanded beads molded article was bent and ruptured, and the ruptured cross section was observed. As a result, a percentage of a value obtained by dividing a number of ruptured expanded beads present on the ruptured cross section by a number of all of the expanded beads present on the ruptured cross section was defined as a material destruction rate (%) and evaluated according to the following criteria.

A: In rupturing the expanded beads molded article, the material destruction rate of the expanded beads is 70% or more.

B: In rupturing the expanded beads molded article, the material destruction rate of the expanded beads is 30% or more and less than 70%.

C: In rupturing the expanded beads molded article, the material destruction rate of the expanded beads is less than 30%.

2. Compression Strength of Molded Article

A test piece of 50 mm in length×50 mm in width×25 mm in thickness was cut out from the expanded beads molded article and subjected to a compression test at a compression rate of 10 mm/min in accordance with JIS K6767 (1999) to determine a 50% compression stress of the expanded beads molded article, and the evaluation was made according to the following criteria.

A: The 50% compression stress of the expanded beads molded article is 300 kPa or more.

B: The 50% compression stress of the expanded beads molded article is 275 kPa or more and less than 300 kPa.

C: The 50% compression stress of the expanded beads molded article is less than 275 kPa.

3. Flame Retardancy of Molded Article

An oxygen index was measured by a test method of polymer material by the oxygen index method described in JIS K7201-2 (2007). The oxygen index was measured with a flame retardancy testing device (ON-1 Type), manufactured by Suga Test Instruments Co., Ltd., and the evaluation was made according to the following criteria.

A: The oxygen index of the expanded beads molded article is 29% by volume or more.
B: The oxygen index of the expanded beads molded article is 27% by volume or more and less than 29% by volume.
C: The oxygen index of the expanded beads molded article is less than 27% by volume <Preparation of Core Layer Resin Composition>

The resin (a1) and the resin (a2) were melt kneaded in a mixing ratio shown in Table 1 by using a 65 mmϕ single-screw extruder. The melt kneaded material was extruded in a strand-like form from small holes of a nozzle installed in a tip of the extruder, cooled in a water tank, and then cut such that a weight of the strand was approximately 5 mg, followed by drying to obtain beads of a core layer resin composition (mixed resins 1 to 7).

A cell adjusting agent, a coloring agent, and a flame retardant were blended as a master batch in the propylene-based resin of the core layer such that the content of zinc borate as the cell adjusting agent was 500 ppm by weight, the content of carbo black as the coloring agent was 2.7% by weight, and the contents of bis(2,3-dibromopropyl ether) tetrabromobisphenol A and antimony trioxide as the flame retardant were 5.0% by weight and 2.5% by weight, respectively.

(Production of Expanded Beads)

Subsequently, expanded propylene resin beads were prepared using the aforementioned multi-layered resin beads.

First of all, 1 kg of the above-obtained multi-layered resin beads were charged together with 3 L of water as a dispersing medium in a 5-liter closed vessel equipped with a stirring

TABLE 1

Constitution of core layer resin composition (mixed resin)

| Mixed resin No. | Resin a1 Kind | Resin a1 Melting point °C. | Resin a1 Mixing ratio % by weight | Resin a2 Kind | Resin a2 Melting point °C. | Resin a2 Mixing ratio % by weight | Difference in melting point between resin a2 and resin a1 °C. | Physical properties of mixed resin Melting point TmA °C. | Physical properties of mixed resin Flexural modulus MPa |
|---|---|---|---|---|---|---|---|---|---|
| Mixed resin 1 | Metallocene Ethylene-propylene random copolymer | 135 | 95 | Ethylene-propylene random copolymer | 156 | 5 | 21 | 136 | 900 |
| Mixed resin 2 | Metallocene Ethylene-propylene random copolymer | 135 | 90 | Ethylene-propylene random copolymer | 156 | 10 | 21 | 138 | 920 |
| Mixed resin 3 | Metallocene Ethylene-propylene random copolymer | 137 | 97 | Ethylene-propylene random copolymer | 153 | 3 | 16 | 138 | 890 |
| Mixed resin 4 | Metallocene Ethylene-propylene random copolymer | 135 | 90 | Homopropylene | 163 | 10 | 28 | 140 | 1040 |
| Mixed resin 5 | Ethylene-propylene random copolymer | 138 | 85 | Ethylene-propylene random copolymer | 156 | 15 | 18 | 142 | 920 |
| Mixed resin 6 | Metallocene Ethylene-propylene random copolymer | 135 | 70 | Ethylene-propylene random copolymer | 156 | 30 | 21 | 145 | 1100 |
| Mixed resin 7 | Metallocene Ethylene-propylene random copolymer | 135 | 90 | Metallocene Ethylene-propylene random copolymer | 146 | 10 | 11 | 136 | 900 |

<Preparation of Expanded Propylene Resin Beads>
(Production of Multi-Layered Resin Beads)

An apparatus in which a core layer-forming extruder having an inside diameter of 65 mm and a cover layer (outer layer)-forming extruder having an inside diameter of 30 mm were connected with a coextrusion die was used.

A mixed resin shown in the "Core layer" column in Table 2 was fed into the core layer-forming extruder and then melt kneaded. A resin of the kind shown in the "Cover layer" column in Table 2 was fed into the cover layer-forming extruder and then melt kneaded.

The respective melt kneaded materials were laminated and combined within the coextrusion die in a proportion in the beads shown in the "Core layer" and "Cover layer" columns in Table 2 and coextruded in a multi-layered strand-like form in which an annular core layer having a penetrating tubular hole and a cover layer covering the outer periphery of the core layer from small holes of a nozzle installed in a tip of the extruder, and subsequently, the strand was cooled with water and then cut in a weight of approximately 1.5 mg by a pelletizer, followed by drying to obtain multi-layered resin beads.

unit, and furthermore, 0.3 parts by weight of kaolin as a dispersant, 0.004 parts by weight of a surfactant (a trade name: Neogen S-20F, manufactured by Dai-ichi Kogyo Seiyaku Co., Ltd.; sodium alkylbenzenesulfonate) in terms of an active component amount, and carbon dioxide in the form of dry ice as a blowing agent in an amount shown in Table 3 (amount of the "$CO_2$ amount" column) were charged.

Subsequently, the temperature of the dispersing medium was increased under stirring to a temperature that is lower by 5° C. than the foaming temperature shown in Table 3, followed by holding at that temperature for 15 minutes. Thereafter, the temperature was increased to the foaming temperature shown in Table 3, followed by holding at that temperature for 15 minutes. Thereafter, the contents were released under atmospheric pressure while applying a back pressure of a foaming pressure of 2.8 MPa (G) by carbon dioxide, thereby obtaining approximately annular, black expanded propylene resin beads each having a penetrating tubular hole. Physical properties of the obtained expanded beads are shown in Table 3.

The addition amounts (parts by weight) of the blowing agent, the dispersant, and the surfactant are amounts based on 100 parts by weight of the propylene resin beads.

A cross section of the expanded propylene resin bead was observed by an optical microscope. As a result, the mixed resin of the core layer was in a favorable foamed and expanded state of a closed-cell structure, whereas the olefin-based resin of the cover layer was covered in a non-foamed state the core layer as shown in FIG. 1.

<Production of Expanded Propylene Resin Beads Molded Article>

An expanded beads molded article was prepared using the above-obtained expanded propylene resin beads.

First of all, the expanded beads were filled in a mold for a plank of 500 mm in length×300 mm in width×100 mm in thickness and subjected to in-mold molding by a compression molding method using steam as a heating medium, thereby obtaining an expanded beads molded article in the form of a plank.

The heating method at the time of in-mold molding was performed as follows. Steam was fed for 5 seconds in a state of opening drain valves in the both molds to perform preheating; and one-direction flow heating was performed at a pressure that is lower by 0.04 MPa(G) than the molding pressure shown in Table 3. Furthermore, reversed one-direction flow heating was performed at a pressure that is lower by 0.02 MPa(G) than the molding pressure shown in Table 3, followed by heating with steam at the molding pressure shown in Table 3 [molding vapor pressure: for example, 0.16 MPa(G) in Example 1].

After completion of the heating, the pressure was released, and cooling with water was performed until the value of a surface pressure gauge installed on the inner surface of the mold was reduced to 0.04 MPa(G). The mold was then opened, and the molded article was taken out therefrom. The resulting molded article was aged within an oven at 60° C. for 12 hours and then gradually cooled to obtain an expanded beads molded article. There was thus obtained a 100 mm-thick expanded beads molded article having interconnected voids in the form of a plank.

The evaluation results of the expanded beads molded article are shown in Table 3.

Example 6

An expanded beads molded article was obtained in the same manner as in the aforementioned Example 2, except that the bis(2,3-dibromopropyl ether)tetrabromobisphenol A blended in the propylene-based resin of the core layer was changed to tetrabromobisphenol A. Various physical properties of the expanded beads and the expanded beads molded article are shown in Table 3.

Example 7

An expanded beads molded article was obtained in the same manner as in the foregoing Example 2, except that in the production of an expanded propylene resin beads molded article, a mold for a plank of 200 mm in length×250 mm in width×50 mm in thickness was used, and the molding pressure was changed to 0.13 MPa(G). Various physical properties of the expanded beads and the expanded beads molded article are shown in Table 3.

TABLE 2

| | | Constitution of expanded beads | | | | | |
|---|---|---|---|---|---|---|---|
| | | Cover layer | | | | Core layer | |
| | | Melting point TmB ° C. | Difference between TmA and TmB ° C. | Amount in bead[1] Parts by weight | Number | Mixed resin Melting point TmA ° C. | Amount in bead[1] Parts by weight |
| | Kind of resin | | | | | | |
| Example 1 | Metallocene Ethylene-propylene random copolymer | 125 | 11 | 5 | Mixed resin 1 | 136 | 95 |
| Example 2 | Metallocene Linear low density polyethylene | 100 | 38 | 15 | Mixed resin 2 | 138 | 85 |
| Example 3 | Metallocene Linear low density polyethylene | 100 | 38 | 15 | Mixed resin 3 | 138 | 85 |
| Example 4 | Metallocene Linear low density polyethylene | 100 | 40 | 15 | Mixed resin 4 | 140 | 85 |
| Example 5 | Metallocene Linear low density polyethylene | 100 | 42 | 5 | Mixed resin 5 | 142 | 95 |
| Example 6 | Metallocene Linear low density polyethylene | 100 | 38 | 15 | Mixed resin 2 | 138 | 85 |
| Example 7 | Metallocene Linear low density polyethylene | 100 | 38 | 15 | Mixed resin 2 | 138 | 85 |
| Comparative Example 1 | Metallocene Ethylene-propylene random copolymer | 125 | 20 | 5 | Mixed resin 6 | 145 | 95 |
| Comparative Example 2 | Metallocene Linear low density polyethylene | 100 | 36 | 5 | Mixed resin 7 | 136 | 95 |

[1]Amount based on 100 parts by weight of a sum total weight of cover layer and core layer

TABLE 3

| | Foaming condition | | Expanded beads | | | Molding | Evaluation of molded article | | | | |
|---|---|---|---|---|---|---|---|---|---|---|---|
| | Foaming temperature °C. | $CO_2$ amount Parts by weight | Apparent density g/L | Minimum outer diameter $D_{MN}$ (D) mm | Minimum hole diameter $d_{MN}$ mm | condition Molding pressure MPa* | Density of molded article g/L | Voidage % | Fusion bonding properties — | Compression strength — | Flame retardancy — |
| Example 1 | 150.0 | 6.0 | 89 | 3.6 | 2.0 | 0.16 | 45 | 30 | A | A | A |
| Example 2 | 152.0 | 5.0 | 90 | 3.5 | 2.0 | 0.14 | 45 | 28 | A | A | A |
| Example 3 | 151.0 | 6.5 | 88 | 3.4 | 1.8 | 0.14 | 45 | 30 | A | B | A |
| Example 4 | 153.5 | 5.0 | 91 | 3.7 | 2.2 | 0.16 | 45 | 35 | A | A | A |
| Example 5 | 152.5 | 6.0 | 91 | 3.5 | 1.9 | 0.18 | 45 | 32 | A | A | A |
| Example 6 | 152.0 | 5.0 | 92 | 3.6 | 2.0 | 0.14 | 45 | 33 | A | A | B |
| Example 7 | 152.0 | 5.0 | 87 | 3.6 | 2.1 | 0.13 | 45 | 28 | A | A | A |
| Comparative Example 1 | 154.5 | 5.0 | 89 | 3.6 | 2.0 | 0.26 | 45 | 29 | A | A | A |
| Comparative Example 2 | 149.5 | 7.0 | 86 | 3.5 | 1.8 | 0.14 | 45 | 28 | A | C | A |

(*The molding pressure is a gauge pressure.)

It is noted from Table 3 that in the Examples, the expanded beads molded articles having interconnected voids, each of which exhibits sufficient mechanical physical properties at a low molding pressure and has excellent fusion bonding properties among the expanded beads, are obtained, as compared with those in the Comparative Examples.

INDUSTRIAL APPLICABILITY

The expanded beads of the present invention are ones having a tubular shape and are excellent in fusion bonding properties among the expanded beads and are able to reduce a molding pressure by a heating medium at the time of in-mold molding, from which an expanded beads molded article having a large number of communicated holes and exhibiting favorable mechanical physical properties can be obtained. In consequence, in view of the fact that the expanded beads molded article obtained from the foregoing expanded beads not only exhibits inherent physical properties due to interconnected voids but also exhibits favorable mechanical physical properties, it is applicable to multi-purpose uses, for example, vehicle members such as a sheet cushioning core material, a sheet back core material, a bumper core material, a floor level raising material, a tibia pad, a door pad, a luggage box, etc., core materials such as a float, a surfboard, a helmet, a unit bath, a bathtub, a water storage tank, a waterproof pan, a chair, etc., a packaging container, a packaging buffer, and so on.

REFERENCE SIGNS LIST

1: Expanded beads molded article
2: Expanded bead
3: Core layer
4: Tubular hole
5: Cover layer
6: Voids
12: Expanded beads

The invention claimed is:

1. Expanded propylene resin beads comprising a core layer being in a foamed state, having a tubular shape having a penetrating tubular hole, and being constituted of a propylene-based resin composition (a) and a cover layer covering the core layer and being constituted of an olefin-based resin (b), the propylene-based resin composition (a) satisfying the following (i) and (ii), and the olefin-based resin (b) satisfying the following (iii) or (iv):

(i) the propylene-based resin composition (a) is a mixture of 75% by weight to 98% by weight of a propylene-based resin (a1) having a melting point of 100° C. to 140° C. and 2% by weight to 25% by weight of a propylene-based resin (a2) having a melting point of 140° C. to 165° C., provided that a sum total weight of the propylene-based resin (a1) and the propylene-based resin (a2) is 100% by weight;

(ii) a difference between the melting point of the propylene-based resin (a2) and the melting point of the propylene-based resin (a1) [(melting point of a2)–(melting point of a1)] is 15° C. or more;

(iii) the olefin-based resin (b) is a crystalline olefin-based resin having a melting point (TmB) that is lower than a melting point (TmA) of the propylene-based resin composition (a), with a difference between the melting point (TmA) and the melting point (TmB) [TmA–TmB] being more than 0° C. and 80° C. or less; and (iv) the olefin-based resin (b) is a non-crystalline olefin-based resin having a softening point (TsB) that is lower than the melting point (TmA) of the propylene-based resin composition (a), with a difference between the melting point (TmA) and the softening point (TsB) [TmA–TsB] being more than 0° C. and 100° C. or less, wherein a melt flow rate range for the propylene-based resin (a1) is from 1 to 100 g/10 min. and a melt flow rate range for the propylene-based resin (a2) is from 2 to 18 g/10 min.

2. The expanded propylene resin beads according to claim 1, wherein in the foregoing (ii), the difference in melting point between the propylene-based resin (a2) and the propylene-based resin (a1) [(melting point of a2)–(melting point of a1)] is 15 to 25° C.

3. The expanded propylene resin beads according to claim 1, wherein the propylene-based resin (a1) is a propylene-based resin obtained through polymerization in the presence of a metallocene-based polymerization catalyst.

4. The expanded propylene resin beads according to claim 1, wherein the propylene-based resin (a1) and the propylene-based resin (a2) each is a propylene-based resin obtained through polymerization in the presence of a metallocene-based polymerization catalyst.

5. The expanded propylene resin beads according to claim 1, wherein the propylene-based resin composition (a) has a flexural modulus of 900 MPa to 1,200 MPa.

6. The expanded propylene resin beads according to claim 1, wherein the propylene-based resin composition (a) has a content of the propylene-based resin (a1) of more than 90% by weight and 98% by weight or less and a content of the propylene-based resin (a2) of 2% by weight or more and less than 10% by weight, provided that a sum total weight of the propylene-based resin (a1) and the propylene-based resin (a2) is 100% by weight.

7. The expanded propylene resin beads according to claim 1, wherein the olefin-based resin (b) is an ethylene-based resin obtained through polymerization in the presence of a metallocene-based polymerization catalyst.

8. The expanded propylene resin beads according to claim 1, wherein the propylene-based resin composition (a) is blended with at least one flame retardant selected from a brominated bisphenol A-based flame retardant, a brominated bisphenol S-based flame retardant, a brominated butadiene-styrene block copolymer flame retardant, and a brominated polyphenyl ether flame retardant.

9. An expanded propylene resin beads molded article having interconnected voids, which is obtained through in-mold molding of the expanded propylene resin beads according to claim 1.

10. The expanded propylene resin beads according to claim 1, wherein a maximum outer diameter D in the cross section of the core layer in the perpendicular direction to the axial direction through which the tubular hole of the core layer penetrates is 3 to 12 mm.

11. The expanded propylene resin beads according to claim 1, wherein a minimum hole diameter $d_{MIN}$ in the cross section of the core layer in the perpendicular direction to the axial direction through which the tubular hole of the core layer penetrates is 1 to 6 mm.

12. The expanded propylene resin beads according to claim 1, wherein the core layer is in a foamed state and has a tubular shape having a penetrating tubular hole which satisfies the following formulae (1) and (2):

$$d_{MIN} \geq 1.0 \text{ (mm)} \tag{1}$$

$$d_{MIN}/D_{MIN} \leq 0.80 \tag{2}$$

wherein $d_{MIN}$ is a minimum hole diameter (mm) in the cross section of the core layer in the perpendicular direction to the axial direction through which the tube-shaped tubular hole penetrates, and $D_{MIN}$ is a minimum outer diameter (mm) of the core layer in a position of the cross-section of the core layer, at which the hole diameter is $d_{MIN}$.

13. The expanded propylene resin beads according to claim 1, wherein the propylene-based resin (a1) is a propylene-based random copolymer obtained through polymerization in the presence of a metallocene-based polymerization catalyst, and the propylene-based resin (a2) is a propylene-based copolymer.

14. The expanded propylene resin beads according to claim 1, wherein the propylene-based resin (a1) has a melting point of 130° C. or more and less than 140° C.

15. The expanded propylene resin beads according to claim 1, wherein the propylene-based resin (a2) has a melting point of 150° C. or more and less than 165° C.

16. The expanded propylene resin beads according to claim 1, wherein the propylene-based resin (a2) has a melting point of 150° C. to 160° C.

17. The expanded propylene resin beads according to claim 1, wherein a length of the core layer in the axial direction through which the tubular hole of the core layer penetrates is 2 to 20 mm.

18. The expanded propylene resin beads according to claim 11, wherein a minimum hole diameter $d_{MIN}$ is 1.9 to 6 mm.

19. The expanded propylene resin beads according to claim 12, wherein the core layer being in a foamed state and having a tubular shape having a penetrating tubular hole satisfies the following formula (2):

$$d_{MIN}/D_{MIN}=0.53 \text{ to } 0.80 \tag{2}$$

20. The expanded propylene resin beads molded article according to claim 9, wherein the voidage of the expanded beads molded article of the present invention is 7 to 50%.

* * * * *